United States Patent
Suzuki et al.

(10) Patent No.: US 8,160,531 B2
(45) Date of Patent: Apr. 17, 2012

(54) RECEIVING DEVICE FOR ADJUSTING ENERGY OF A RECEIVED SIGNAL SENT OVER A TRANSMISSION LINE

(75) Inventors: Youichirou Suzuki, Nishio (JP); Noboru Maeda, Chiryu (JP); Takahisa Koyasu, Chita (JP); Koji Kondo, Tokoname (JP); Shigeki Takahashi, Okazaki (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 530 days.

(21) Appl. No.: 12/382,139

(22) Filed: Mar. 10, 2009

(65) Prior Publication Data

US 2009/0233565 A1 Sep. 17, 2009

(30) Foreign Application Priority Data

Mar. 17, 2008 (JP) .................................. 2008-67711
Nov. 14, 2008 (JP) ................................ 2008-292076

(51) Int. Cl.
*H04B 1/18* (2006.01)
(52) U.S. Cl. ......... 455/282; 455/280; 455/292; 375/257
(58) Field of Classification Search .................. 455/280, 455/282, 292; 375/257
See application file for complete search history.

(56) References Cited

U.S. PATENT DOCUMENTS

| 5,457,406 | A | 10/1995 | Takeda |
| 5,872,471 | A | 2/1999 | Ishibashi et al. |
| 6,218,854 | B1 | 4/2001 | Ko |
| 6,326,803 | B1 | 12/2001 | Takeda |
| 6,487,250 | B1 | 11/2002 | Kato et al. |
| 7,324,587 | B2 | 1/2008 | Nishizaki |
| 2005/0243010 | A1* | 11/2005 | Terry .............................. 343/841 |
| 2006/0214507 | A1 | 9/2006 | Suzuki |

FOREIGN PATENT DOCUMENTS

| DE | 196 39 162 | 6/1998 |
| JP | 03-164027 A | 7/1991 |
| JP | 05-83113 A | 4/1993 |
| JP | 07-288438 A | 10/1995 |
| JP | A-09-238164 | 9/1997 |
| JP | 10-108359 A | 4/1998 |
| JP | 2002-33775 A | 1/2002 |
| JP | A-2004-281960 | 10/2004 |

OTHER PUBLICATIONS

Notice of Reasons for Rejection mailed on May 18, 2010 issued from the Japanese Patent Office in the corresponding Japanese patent application No. 2008-292076 (and English translation).
Office Action mailed on Jun. 29, 2010 issued in the corresponding DE patent application No. 10 2009 013 596.0-35 (and English translation).

* cited by examiner

*Primary Examiner* — Lincoln Donovan
*Assistant Examiner* — John Poos
(74) *Attorney, Agent, or Firm* — Posz Law Group, PLC

(57) ABSTRACT

A receiving device is provided capable of avoiding reception of unnecessary energy when a signal waveform actually changes on a receiving side. An impedance control circuit includes a sensing unit to sense one or more of a voltage, current, or power of a signal to be received by a receiving circuit. The impedance control unit varies an input impedance according to the change in the sensed one or more quantities so that the received signal will be reflected. Thus the excess energy of the signal is reflected and fed to any other receiving circuit achieving stable communications.

25 Claims, 20 Drawing Sheets

RECEIVING DEVICE FOR ADJUSTING ENERGY OF A RECEIVED SIGNAL SENT OVER A TRANSMISSION LINE

CROSS-REFERENCE TO RELATED APPLICATIONS

The present application is based on and claims priority to Japanese Application Nos. JP 2008-067711, filed Mar. 17, 2008 and JP 2008-292076, filed Nov. 14, 2008 the entire contents of both of which are incorporated herein by reference.

BACKGROUND OF THE INVENTION

1. Field of the Invention

The present invention relates to a receiving device for adjusting the energy of a received signal sent over a transmission line.

2. Description of the Related Art

For transmission of a digital signal over a transmission line, a receiving side is disadvantageously confronted with an overshoot, an undershoot, or any other distortion that might occur because part of the energy of a signal is reflected at the time at which the signal level changes. Various proposals have been made for a technology to suppress a waveform distortion. For example, JP-A-2001-127805 describes a technology in which, assuming that the voltage level of a signal makes a transition between low and high levels, a termination circuit 11 for a transmission line tentatively decreases the impedance at a terminal 5 during a time delay which is given by a delay circuit 20.

JP-A-2000-353945 describes a technology for continuously varying an output impedance on a signal transmitting side when the level of an output signal changes. JP-A-2000-059444 describes a technology in which an attenuation circuit 112 attenuates an overshoot or an undershoot on a receiving side and a charging/discharging circuit 114 charges or discharges the output terminal of the attenuation circuit 112 with respect to a supply voltage or a ground voltage.

In an actual communication network, if numerous communication nodes are connected onto a transmission line, an energy distribution on the transmission line may become uneven, depending on particular aspects of the signal transmission. Unnecessary signal energy is received at some communication nodes, while insufficient energy is received at other communication nodes posing a disadvantage in that reception cannot be carried out normally or uniformly. The foregoing patent documents fail to describe such disadvantages.

SUMMARY OF THE INVENTION

Various exemplary embodiments are disclosed herein to address the foregoing disadvantages, and to provide a receiving device that can avoid reception of unnecessary energy when a signal waveform actually changes on a receiving side.

According to one aspect, an exemplary receiving device includes an impedance control means that uses a sensing unit to sense one or more of the voltage, current, and power of a signal to be received by a receiving circuit, and varies an input impedance according to a change in one or more of the objects of sensing so that a received signal will be reflected. If the energy of a signal becomes excess, the excess energy can be reflected when the received signal actually changes. The excess energy can be fed to any other receiving circuit resulting in more stable communication.

According to another aspect of an exemplary receiving device, when one or more of the objects of sensing exceed a pre-set threshold, an impedance control means changes an input impedance. The impedance can therefore be abruptly varied.

According to another aspect, an exemplary receiving device includes an impedance control means that changes an input impedance so that the input impedance will be mismatched with the characteristic impedance of a transmission line. Therefore, signal energy can be effectively reflected.

According to another aspect, when a transmission line includes a pair of signal lines over which differential signals are transmitted, at least a sensing unit included in an impedance control means is disposed in association with each of the signal lines. Therefore, excess signal energy can be reflected at either of the time of a rising transition in one of the differential signals and the time of a falling transition therein.

According to another aspect, an exemplary receiving device includes an impedance control means formed as a constant current circuit that limits a current flowing in or over a transmission line to a value equal to or smaller than a threshold. Namely, when a signal is transmitted, if a current flowing over the transmission line has a certain level or more, the energy of the signal becomes excess. Therefore, if the current is confined to the value equal to or smaller than the threshold, since an extra current is not inputted to a receiving circuit, an input impedance increases equivalently. Signal energy can be reflected and fed to any other receiving circuit.

According to another aspect, a constant current circuit in the exemplary receiving device includes constant current diodes. Namely, since the constant current diodes exerts the operation of limiting a current flowing through the constant current diodes, to a value equal to or smaller than a predetermined threshold, the constant current circuit can be readily formed.

According to another aspect of an exemplary receiving device, when a transmission line is configured as a pair of signal lines over which differential signals are transmitted, a fluctuation in a current can be sensed while sustaining the equilibrium of the differential signal line since a pair of constant current diodes connected to be oriented in mutually opposite directions is disposed on each of the signal lines. Signal energy can be reflected at one of the time of a rising change in a differential signal and at the time of a falling change.

According to another aspect of an exemplary receiving device, when the voltage of a received signal sensed by one of sensing units is equal to or smaller than a threshold, an impedance control means turns on one of field-effect transistors (FETs) that are inserted to the respective signal lines constituting a transmission line. When the voltage of the received signal exceeds the threshold, the impedance control means turns off the one of the FETs. Therefore, an impedance of the transmission line can be increased and the energy of the received signal can be reflected.

According to another aspect of an exemplary receiving device, when FETs are of the depletion type, the sources of the FETs are connected to the receiving circuit sides of signal lines, and the gates thereof are connected to the signal lines, which are different from the signal lines to which the FETs are inserted, or to a ground. Hereinafter, reference to the gate of the FET being connected to the signal line or ground, means that the gate is connected to the signal line. When a potential difference between the signal lines or between the signal line and ground is small, the depletion-type FETs are retained in the ON state. Along with an increase in the potential difference, the FETs are shifted to an OFF state.

According to another aspect, if FETs are of the enhancement type, the sources of the FETs are connected to the receiving circuit sides of signal lines, and the gates thereof are connected to the signal lines to which the FETs are inserted via respective diodes, and also connected to the drains thereof via respective resistive elements. Specifically, when a potential difference between signal lines is small, the diodes are de-energized. Therefore, since the gate capacitors are each charged via the resistive element between the drain and gate, the potentials at the gates are higher than the potentials at the sources. Accordingly, the potential difference between the signal lines or between the signal line and ground is increased. When the potential difference increases to be equal to or larger than a threshold, the diodes conduct. The gate capacitors are discharged and the gate potentials are stepped down. Eventually, the FETs are shifted to an OFF state.

According to another aspect, portions of an exemplary step-up means that are configured to step up voltages generated on a transmission line and apply the voltages to the gates of enhancement-type FETs are included. Therefore, even when the threshold voltage of the FETs is set to a relatively large value, the FETs can be reliably shifted from an ON state to an OFF state.

According to another aspect, a step-up means includes a series circuit including a diode and a capacitor connected between signal lines constituting a transmission line or between the signal lines and a ground, and a diode connected between a common node in the series circuit and the gate of one of FETs. When the potential on the signal lines onto which one of the FETs is connected increases, the diode of the series circuit is energized to charge the capacitor. When the potential difference between the signal lines becomes equal to or larger than a threshold, the diode connected to the gate of the FET and to the other signal line is energized. The FET enters an OFF state because the gate potential drops.

When the relationship between potentials is reversed, if the potential on the other signal line is increased, a charging voltage for the capacitor is added to the potential difference between the signal lines. Therefore, a voltage that is approximately twice higher than the potential difference can be applied to the gate of the FET. Therefore, even when the ON voltage of the FETs is set to a large value, the FETs can be reliably turned ON.

According to another aspect of an exemplary receiving device, portions of an exemplary potential difference output means each output a potential difference between a reference voltage and a potential on a signal line to which one of FETs is inserted. Portions of an exemplary comparison means each compare a voltage outputted from the potential difference output means, with a potential on a signal line being different from the signal line into which the FET is inserted. The result of the comparison performed by the comparison means is outputted to the gate of the FET. A reference potential to be referenced in order to shift the FET from an ON state to an OFF state can be reliably designated.

According to another aspect of an exemplary receiving device, a sensing unit includes a voltage conversion means that converts a current flowing over a transmission line into a voltage and portions of exemplary comparison circuits, each of which applies an output signal representing the result of the comparison between the converted voltage and a reference voltage to the gate of one of FETs. When the current flowing over the transmission line increases, one of the FETs can be shifted to an OFF state in order to increase an impedance.

According to another aspect of an exemplary receiving device, a voltage conversion means is included in a receiving circuit, and is realized with a voltage division resistive circuit connected between signal lines constituting a transmission line, or between the signal lines and a ground. Namely, when a current flowing over the transmission line reaches the receiving circuit, the current flows back via the voltage division resistive circuit. Therefore, a current can be converted into a voltage using resistive elements included in the resistive circuit.

According to another aspect of an exemplary receiving device, when a voltage converting element included in a voltage conversion means converts a current flowing over a transmission line into a voltage, an amplification circuit included therein amplifies the voltage and outputs the resultant voltage. Even when the level of a current is low, the current can be reliably sensed.

According to another aspect of an exemplary receiving device, each of FETs inserted into signal lines is adopted as a voltage conversion element. Namely, if a current flowing over a transmission line changes, the ON voltage of one of the FETs varies accordingly. Thus, an operation of voltage conversion is exerted.

According to another aspect of an exemplary receiving device, a resistive element connected in series with each of the FETs is adopted as a voltage conversion element. Current sensing can therefore be achieved with high precision on the basis of a predetermined resistance.

According to another aspect of an exemplary receiving device, a terminal voltage of a first resistive element is equal to a terminal voltage of a voltage conversion element due to the operation of an operational amplifier included in an amplification circuit. Assuming that R1 and R2 denote the resistances of first and second resistive elements and V1 and V2 denote the terminal voltages of the first and second resistive elements, the terminal voltage V2 of the second resistive element that is an amplified output is expressed as V2=(R2/R1)×V1. A voltage produced by the voltage conversion element can be amplified according to the resistance ratio of the first and second resistive elements.

According to another aspect of an exemplary receiving device, when each of FETs inserted into signal lines or a first FED is adopted as a voltage conversion element, a first resistive element included in an amplification circuit is replaced with a second FET having a drain and a gate thereof connected in common with those of the first FET and having a source thereof connected to the non-inverting input terminal of an operational amplifier. In such a case, since the second FET is controlled with the same gate signal as the first FET, a current flowing via the first FET flows into the second FET at a predetermined ratio. Therefore, the ON resistance of the second FET can be used in place of that of the first resistive element.

According to another aspect of an exemplary receiving device, a sensing unit includes a voltage comparison block that outputs the result of comparison of a potential on one of signal lines constituting a transmission line with a reference voltage. An AND conditional signal representing the AND of the result of comparison based on a current flowing over the transmission line and the result of the comparison performed by the voltage comparison block is outputted to the gate of each of FETs. Namely, the sensing unit equivalently senses the power of a signal to be transmitted over the transmission line, and can more accurately assess the energy of a received signal.

According to another aspect of an exemplary receiving device, a voltage comparison block compares a potential on one of signal lines constituting a transmission line with a reference voltage using a value representing the sum of a potential on the other signal line or a ground potential and a predetermined offset voltage. Therefore, the increase in potential on one signal line compared to the potential on the other signal line or the ground potential by more than the offset voltage can be sensed.

According to another aspect of an exemplary receiving device, anti-overvoltage protection elements are each connected between one of signal lines constituting a transmission line and one of FETs included in an impedance control means. When an overvoltage is applied to the signal line, the anti-overvoltage protection element allows the signal line and an overcurrent bypass terminal connected to a power supply or a ground to conduct. Therefore, a surge current can be routed into the power supply or ground in order to protect the impedance control means or receiving circuit.

According to another aspect of an exemplary receiving device, an overvoltage protection element is realized with any of a double-diffused monolithic field-effect transistor (DMOSFET), a laterally-diffused monolithic field-effect transistor (LDMOSFET), and a diode. Therefore, when an overvoltage reacts on the gate of the FET or the diode breaks down with an overvoltage, a surge current can be routed into a power supply or a ground.

According to another aspect of an exemplary receiving device, each of overvoltage protection elements is including first and second FETs that are connected in series with each other. In such a case, the first FET has first and second drains that are connected to each other via a substrate layer serving as a formation region for the FET A signal to be transmitted over a signal line in a normal state is transmitted from the first drain of the first FET to the second drain thereof serving as a signal transmission terminal via the substrate layer, and then transmitted to one of FETs, which are included in an impedance control means, through the second drain. When the potentials at the gates of the FETs are stepped up due to application of an overvoltage to the signal line, a surge current flows from the first drain of the first FET to a power supply or a ground through the sources connected in common with each other, and the drain of the second FET serving as an overcurrent bypass terminal. Owing to the actions of the FETs, anti-overvoltage protection can be achieved.

According to another aspect of an exemplary receiving device, the gates of the first and second FETs are left open. Even in such a case, when an overvoltage is applied to the signal line, the overvoltage reacts on the gates. Anti-overvoltage protection can be achieved with a simpler constitution.

According to another aspect of an exemplary receiving device, anti-overvoltage protection elements are each realized with first and second diodes having the anodes thereof connected to each other. In such a case, the first diode has first and second cathodes that are connected to each other via a substrate layer serving as a formation region for the diode. A signal to be transmitted over a signal line in a normal state is transmitted from the first cathode of the first diode to the second cathode thereof serving as a signal transmission terminal via the substrate layer, and then transmitted to one of a plurality of FETs included in an impedance control means, through the second cathode. When an overvoltage is applied to the signal line, if the first diode breaks down, a surge current flows from the first cathode of the first diode to a power supply or a ground through the anodes connected in common with each other, and the cathode of the second diode serving as an overcurrent bypass terminal. The actions of the diodes allows anti-overvoltage protection to be achieved.

According to another aspect of an exemplary receiving device, FETs included in an impedance control means and anti-overvoltage protection elements are formed in regions isolated from one another by an insulating material. The dielectric strength of the material among an elements can be improved, and a dielectric breakdown derived from application of an overvoltage can be prevented.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EXEMPLARY EMBODIMENTS

First Embodiment

Figure 1:
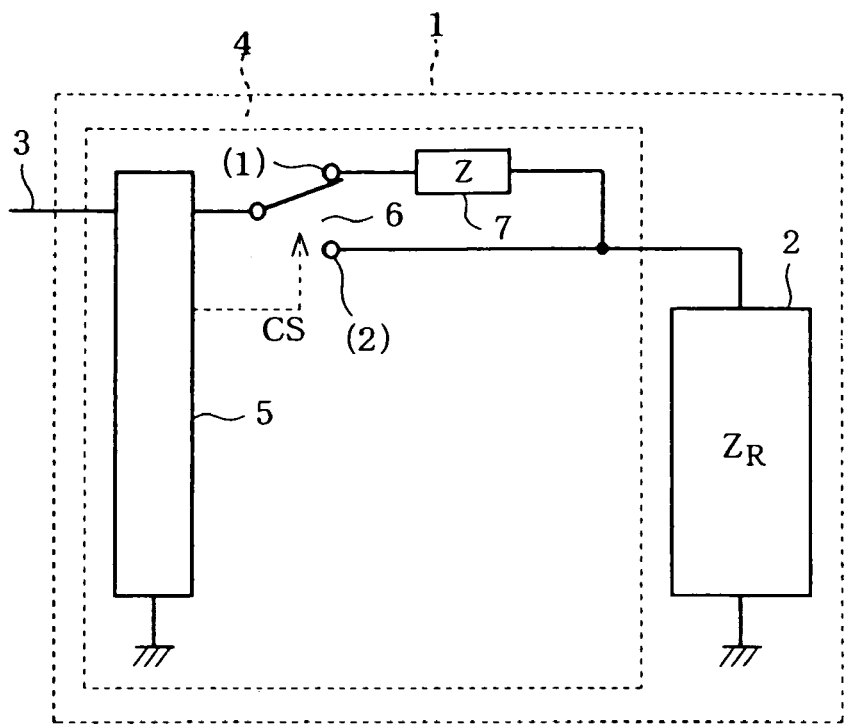
FIG. 1 is a functional block diagram illustrating an exemplary constitution of a receiving device of a first embodiment.

Referring to the figures, such as from FIG. 1 to FIG. 4, a first embodiment will be described below. FIG. 1 is a functional block diagram schematically showing the constitution of a receiving device. The receiving device 1 includes a receiving circuit 2 and an impedance control circuit 4 that serves as an impedance control means and is interposed between a transmission line 3 and the receiving circuit 2. The impedance control circuit 4 includes a sensing unit 5 and a switching circuit 6 inserted into the transmission line 3, and an impedance element 7. The transmission line 3 is single-ended. A signal is transmitted over the transmission line 3 by utilizing a potential difference with respect to a ground.

One terminal of the impedance element 7 is connected onto the receiving circuit 2 side of the transmission line, and the other terminal thereof is connected to a fixed contact (1) of the switching circuit 6. The fixed contact (2) of the switching circuit 6 is connected onto the receiving circuit 2 side of the transmission line 3. A movable contact is connected onto the sensing unit 5 side of the transmission line 3, and is normally connected to the fixed contact (2). Switching of the contacts of the switching circuit 6 is controlled with a control signal CS outputted from the sensing unit 5.

The sensing unit 5 senses one or more of the voltage, current, and power of a signal transmitted over the transmission line 3. If the object of sensing exceeds a threshold designated for the object of sensing, the movable contact of the switching circuit 6 is controlled to have the connection thereof made with the fixed contact (1).

Figure 2A:
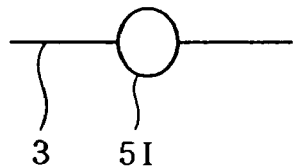
FIG. 2 is a diagram illustrating a constitutional example of an exemplary sensing unit.
Figure 2B:
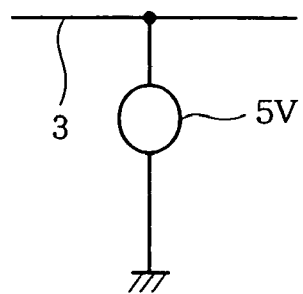

FIG. 2A exemplifies the constitution of the sensing unit 5 adopted when an object of sensing is a current, and FIG. 2B exemplifies the constitution of the sensing unit 5 adopted when the object of sensing is a voltage. A sensing unit 5I in FIG. 2A is inserted to the transmission line 3. In such a case, connection to a ground is unnecessary. A sensing unit 5V in FIG. 2B is connected between the transmission line 3 and the ground. For sensing of a power, both the sensing units 5I and 5V are included and a product of the sensed values is calculated.

Figure 3:
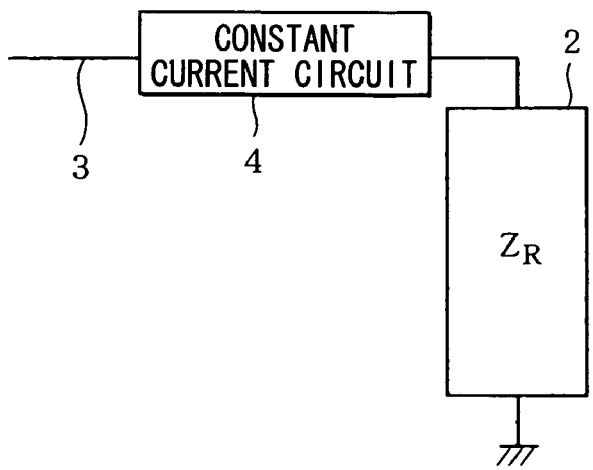
FIG. 3 is a diagram illustrating an exemplary impedance control circuit using a constant current circuit.
Figure 4:
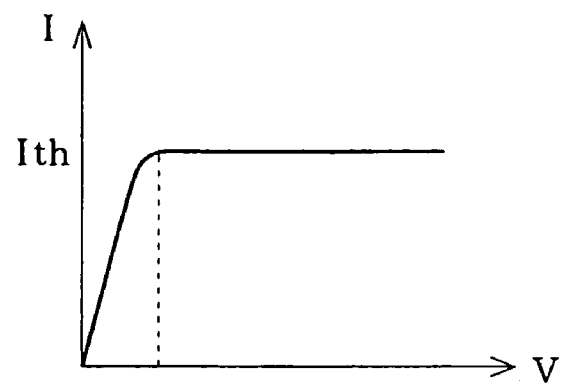
FIG. 4 is a diagram illustrating an exemplary voltage-vs.-current characteristic of the constant current circuit of FIG. 3.

FIG. 3 shows the impedance control circuit 4 as a circuit including the sensing unit 5I shown in FIG. 2A and being realized with a constant current circuit. In the constant current circuit, even if a terminal voltage V is stepped up, a current I will not, as shown in FIG. 4, flow to exceed a threshold Ith. An input current of the receiving circuit 2 can therefore be limited to the value Ith.

Specifically, in a constant current domain, the input current is equivalent to the one attained when an input impedance of the receiving circuit 2 increases. Excess signal energy or current is reflected and fed to any other receiving circuit (not shown) connected onto the transmission line 3. In such a case, the input impedance varies to be mismatched with characteristic impedance Z0 of the transmission line 3. Therefore, the constant current circuit has the capabilities of the switching circuit 6 and impedance element 7 alike.

According to the present embodiment, the impedance control circuit 4 uses the sensing unit 5 to sense one or more of the voltage, current, and power of a signal received by the receiving circuit 2, and varies the input impedance according to a change in one or more of the objects of sensing so that the received signal will be reflected. When the energy of the signal becomes excess, the excess energy can be reflected and fed to any other receiving circuit according to the condition under which the received signal actually changes permitting more stable communication. The impedance control circuit 4 varies the input impedance of the receiving circuit 2 so that the input impedance will be mismatched with characteristic impedance Z0 of the transmission line 3. The signal can therefore be effectively reflected.

When the impedance control circuit 4 is designed as a constant current circuit that limits a current flowing over the transmission line 3, to a value equal to or smaller than the threshold Ith, if the current flowing during signal transmission becomes equal to or larger than the threshold Ith, input of an extra current to the receiving circuit 2 is hindered. The input impedance is equivalently abruptly varied. Signal energy can thus be reflected and fed to any other receiving circuit. The input impedance is varied to be mismatched with characteristic impedance Z0 of the transmission line 3. The signal energy can therefore effectively be reflected.

Second Embodiment

Figure 5:
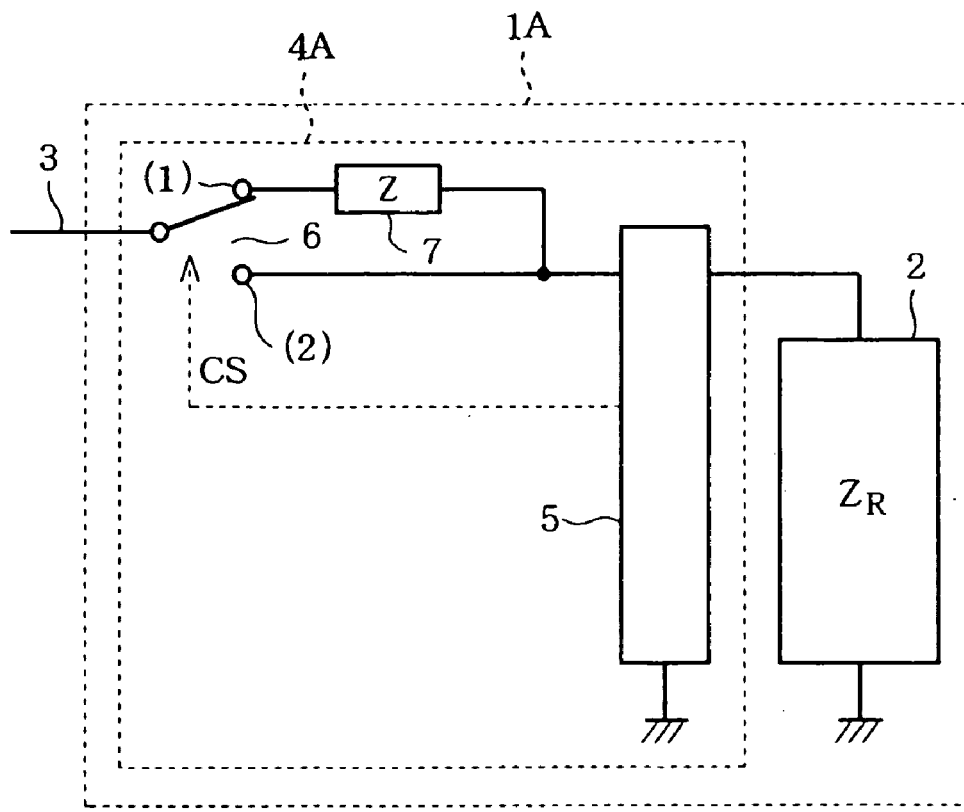
FIG. 5 is a diagram illustrating an exemplary configuration in accordance with a second embodiment.

FIG. 5 shows a second embodiment. The same reference numerals will be assigned to components where identical to those of a first embodiment. Only a difference will be described below. A receiving device 1A of a second embodiment is different from that of a first embodiment only in the inserted position in an impedance control circuit 4A of the sensing unit 5. Specifically, the sensing unit 5 is inserted between a junction point of the transmission line 3 and impedance element 7 and the receiving circuit 2. A second embodiment having the constitution provides the same advantage as a first embodiment.

Third Embodiment

Figure 6A:
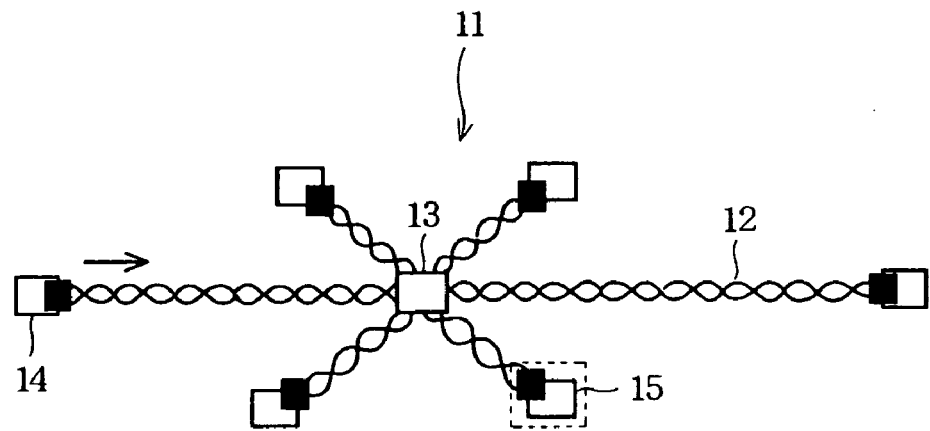
FIG. 6A is a diagram illustrating an exemplary topology of a differential communication network in accordance with a third embodiment.
Figure 6B:
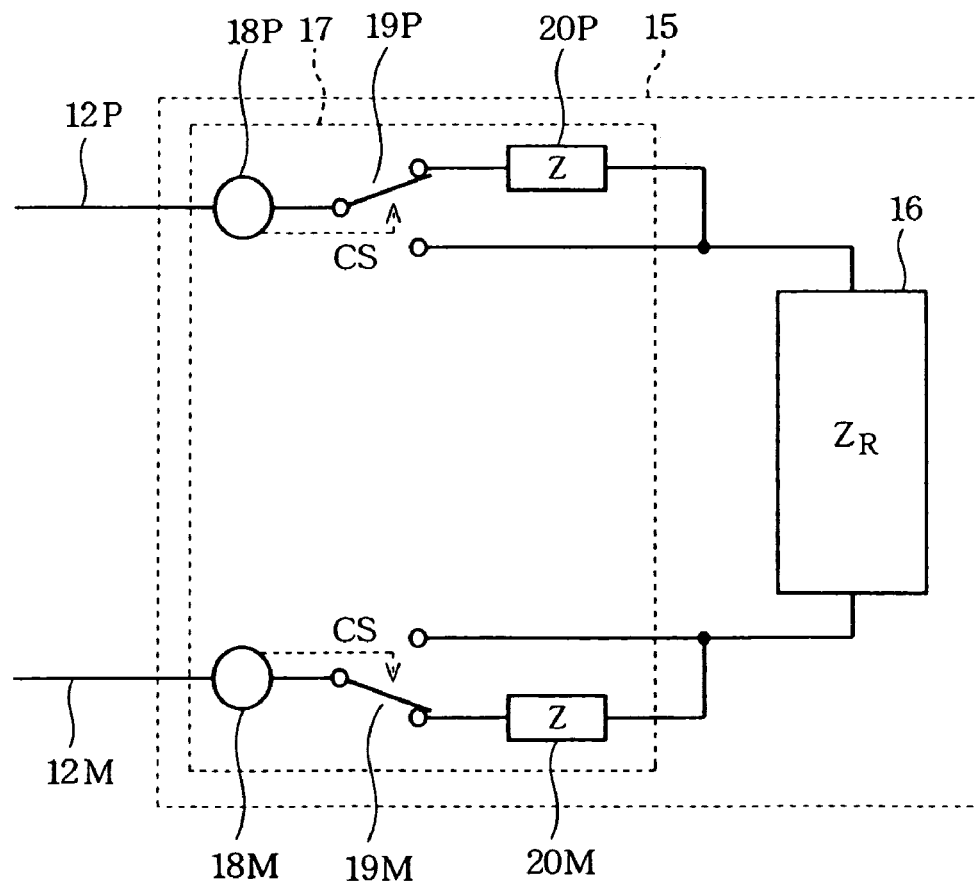
FIG. 6B is a diagram illustrating an exemplary constitution of a receiving node in accordance with a third embodiment.

FIG. 6A and FIG. 6B show a third embodiment. A difference from a first embodiment will be described below. A third embodiment can be implemented in a communication network in which differential signals are transmitted over a pair of signal lines. FIG. 6A shows the topology of the differential communication network. The communication network 11 has multiple communication nodes interconnected over a transmission line 12 configured as a twisted pair. A hub 13 is inserted to the middle of the transmission line 12.

FIG. 6B shows the constitution of a receiving node 15 corresponding to a receiving device and that receives a signal sent from, for example, a transmitting node 14. The receiving node 15 includes a receiving circuit 16 connected between transmission lines 12P and 12M, and an impedance control circuit 17 that serves as an impedance control means. The impedance control circuit 17 includes sensing units 18P and 18M and switching circuits 19P and 19M which are inserted to the transmission lines 12P and 12M respectively, and impedance elements 20P and 20M having one terminals thereof connected to the transmission lines 12P and 12M respectively.

The sensing units 18P and 18M each sense, similarly to the sensing unit 5 included in a first embodiment, one or more of the voltage, current, and power of a signal sent over the transmission line 12P or 12M. When the objects of sensing exceed thresholds designated for the objects of sensing, the connections through the movable contact of the switching circuit 19 are switched from the connection to the transmission line 12 to the connection to the impedance element 20. Impedance control is implemented in the same manner as that in a first embodiment.

According to a third embodiment having the foregoing constitution, since the sensing units 18P and 18M included in the impedance control circuit 17 are disposed in association with the signal lines 12P and 12M respectively, which are the pair of signal lines constituting the transmission line 12 and over which differential signals are transmitted, signal energy can be reflected at either the time of a rising transition or the time of a falling transition in each of the differential signals.

Fourth Embodiment

Figure 7A:
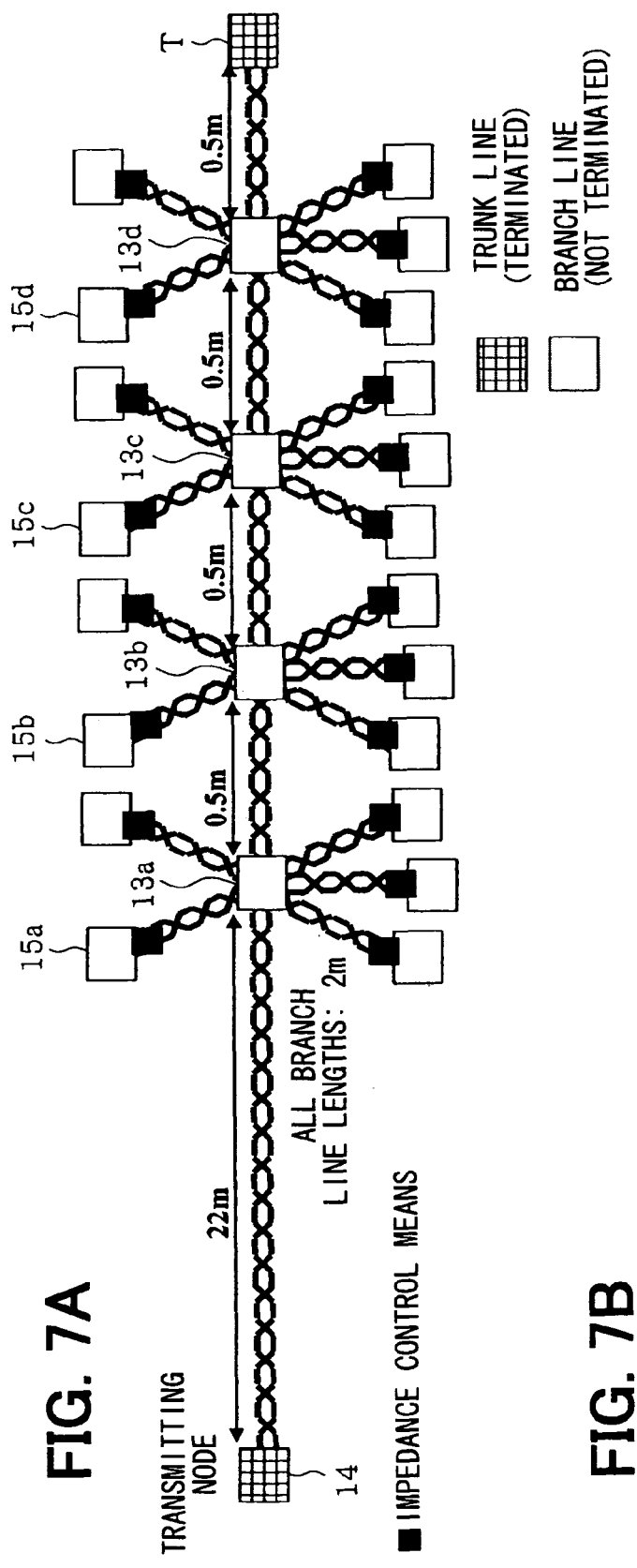
FIG. 7A is a diagram illustrating an exemplary topology of a differential communication network in accordance with a fourth embodiment.

FIG. 7A to FIG. 8E show a fourth embodiment, shows the constitution of a third embodiment more concretely, and also shows the results of simulations of an effect of reflection of signal energy. FIG. 7A presents concrete connecting conditions for a communication network 11 similar to the one shown in FIG. 6A. Four hubs 13 are disposed on the line. A transmission line length between the transmitting node 14 and the first hub 13a is 22 m, and a length between adjoining ones of the subsequent hubs 13b, 13c, and 13d and a termination unit T is 0.5 m. Moreover, a transmission line length between each of receiving nodes 15a to 15d connected to the respective hubs 13a to 13d and each of the hubs 13a to 13d is 2 m. It should be noted that in accordance with various exemplary embodiments, an onboard LAN protocol such as the FlexRay™ protocol, can be adopted as a protocol for the communication network 11.

Figure 7C:
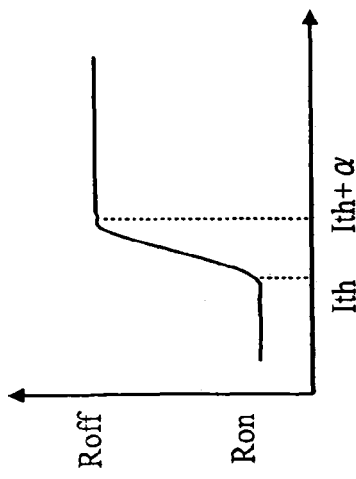
FIG. 7C is a diagram illustrating an exemplary current-vs.-resistance characteristic of an impedance control circuit.
Figure 7B:
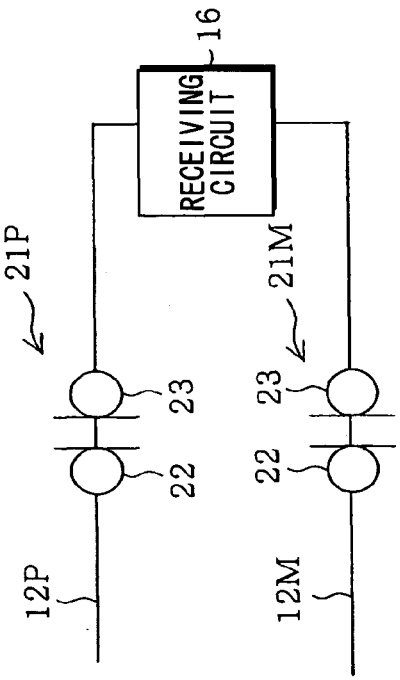
FIG. 7B is a diagram illustrating an exemplary constitution of a receiving node in accordance with a fourth embodiment.
Figure 8A:
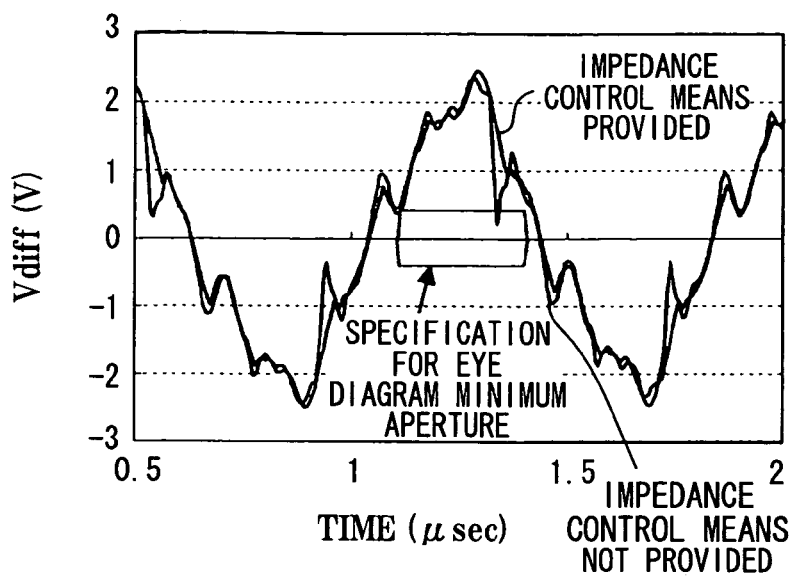
FIG. 8A to FIG. 8E are graphs illustrating various exemplary simulation results including waveforms of received signals attained with and without an impedance control circuit.
Figure 8B:
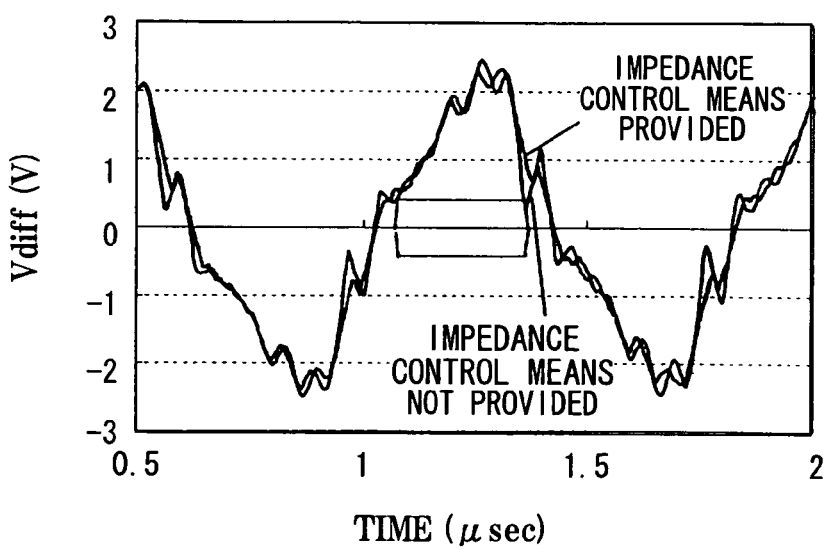
Figure 8C:
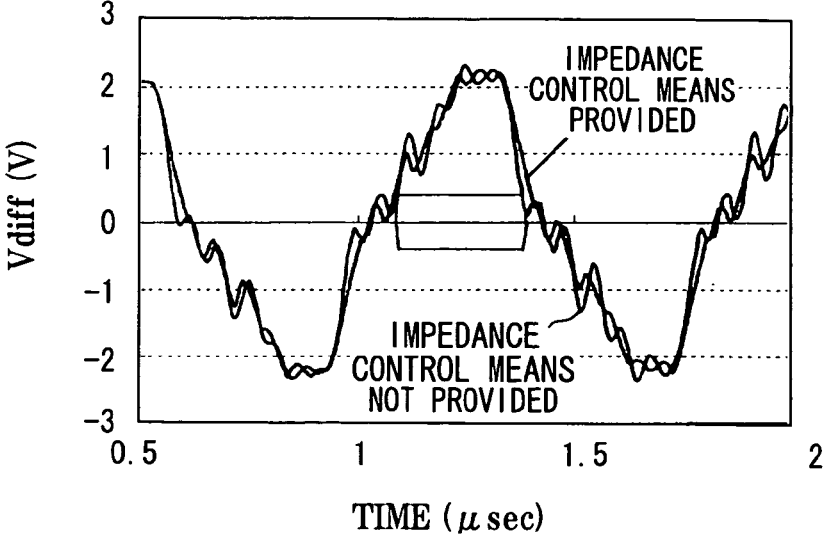
Figure 8D:
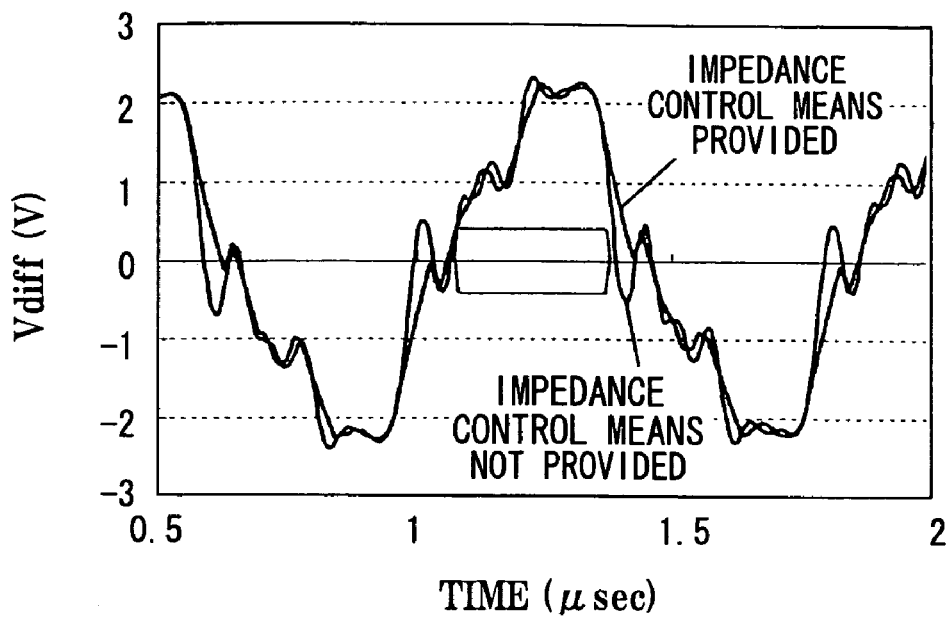
Figure 8E:
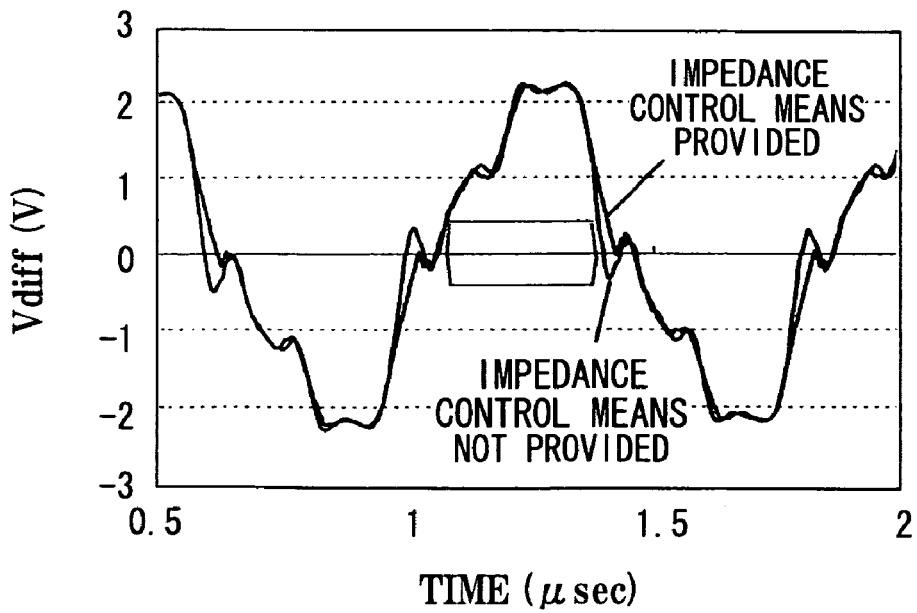

FIG. 7B exemplifies a concrete constitution of the receiving node 15. The receiving circuit 16 modeled with actually measured parameters S is connected between the transmission lines 12P (BP) and 12M (BM). An impedance control circuit 21 including two constant current diodes 22 and 23 that constitute a sensing unit, that serves as an impedance control means and that corresponds to a constant current circuit is connected onto each of the transmission lines 12P and 12M. The constant current diode can be realized with, for example, a junction field-effect transistor (JFET) or a combination of the JFET and a resistive element. The constant current diodes 22 and 23 are connected to be oriented in mutually different directions and are disposed in line with the transmission line such that the received signal passes therethrough. As for a condition for simulation, a transmission speed is 2.5 megabits per second. The transmission line 12 shall cause no loss.

FIG. 7C shows a current-vs.-resistance characteristic of the impedance control circuit 21. Assuming that Ith denotes a current threshold for the constant current diodes 22 and 23, when a resistance offered by the impedance control circuit 21 has a value Ron with respect to current values ending with the current value Ith, the resistance increases up to a value Roff until the current increases to a value (Ith+α).

FIG. 8A to FIG. 8E show the results of simulations, that is, each show waveforms of signals observed when the impedance control circuits 21 are included at the four receiving nodes 15a to 15d and the termination unit T and when the impedance control circuits 21 are not included. In the waveforms, when the impedance control circuits 21 are included in order to reflect signals, the amplitude of the signal waves is larger. The eye diagram minimum aperture of a signal pattern or waveform can be ensured to be large. Namely, when the impedance control circuits 21 are not included, the reflection of signal energy excessively consumed by the receiving circuit 12 is reflected in the voltage amplitude and the power level of the signals.

According to a fourth embodiment, the impedance control circuit 21 includes the two constant current diodes 22 and 23 as described herein above. The pair of impedance control circuits each having the constant current diodes connected to be oriented in mutually opposite directions is disposed on the transmission lines 12P and 12M respectively. Thus, a constant current circuit can be readily constructed. A variation in a current can be sensed with the equilibriums of the lines 12P and 12M respectively, over which differential signals are transmitted, sustained. Signal energy can be reflected at either of the time of a rising transition in each of the differential signals and the time of a falling transition therein.

Fifth Embodiment

Figure 9:
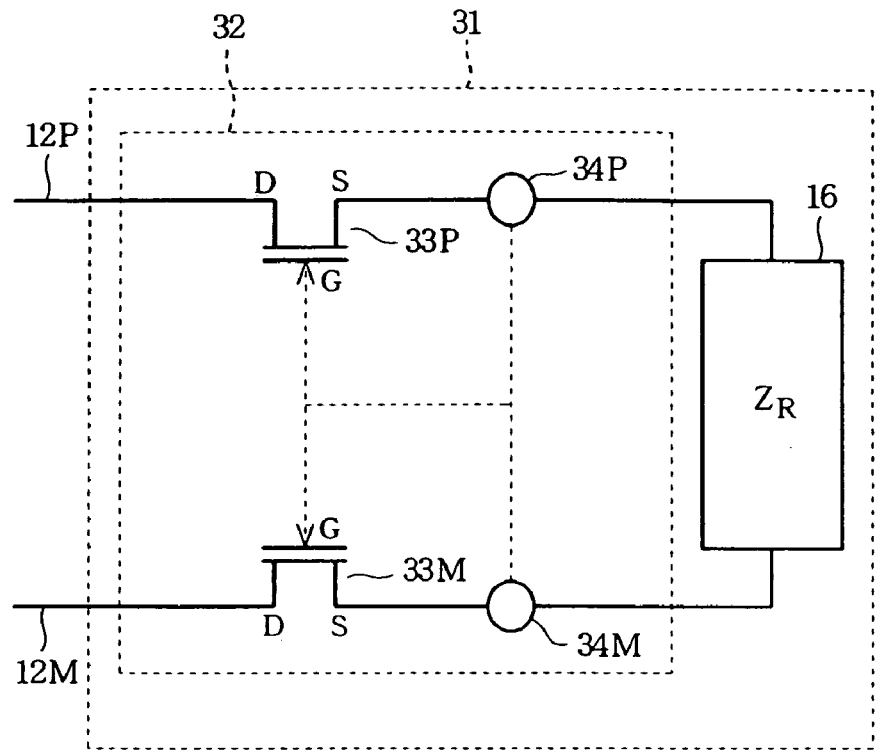
FIG. 9 is a diagram illustrating an exemplary constitution of a receiving node in accordance with a fifth embodiment.
Figure 10:
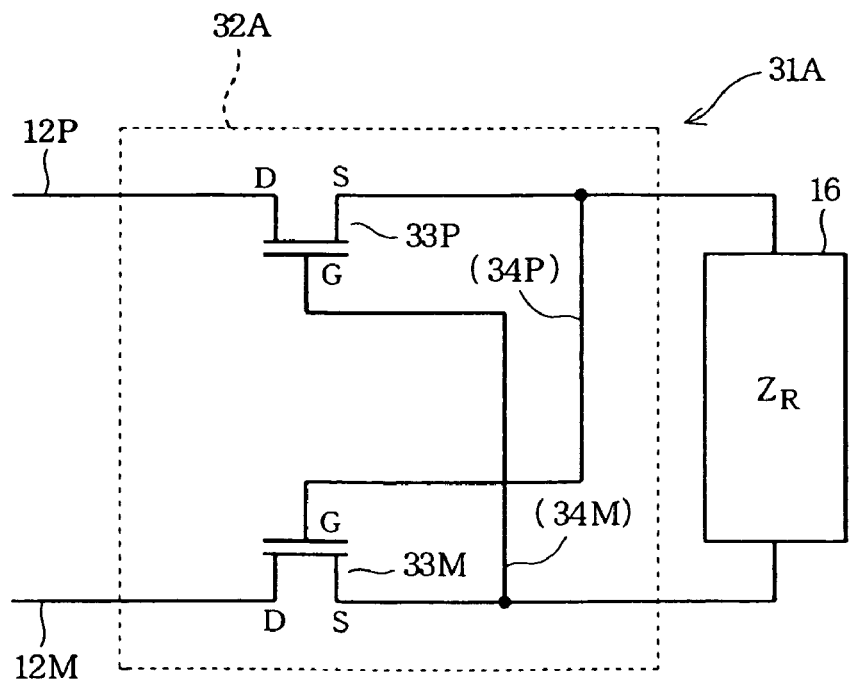
FIG. 10 is a diagram illustrating a concrete example of a constitution of an impedance control circuit.

FIG. 9 and FIG. 10 show a fifth embodiment. FIG. 9 shows the constitution of a receiving device 31 of a fifth embodiment. The receiving device 31 includes a receiving circuit 16 connected between transmission lines 12P and 12M, and an impedance control circuit 32 that serves as an impedance control means. The impedance control circuit 32 includes n-channel metal-oxide semiconductor field-effect transistors (MOSFETs) 33P and 33M and voltage sensing units 34P and 34M which are inserted to the transmission lines 12P and 12M respectively. The voltage sensing units 34P and 34M sense the voltages of signals sent over the transmission lines 12P and 12M respectively. If the sensed voltage exceeds a designated threshold, a control signal is applied to the gates of the FETs 33P and 33M in order to control the ON or OFF state.

FIG. 10 exemplifies a concrete constitution of an impedance control circuit 32A included in a receiving device 31A. In such a case, the FETs 33P and 33M are of the depletion type. The gate of the FET 33P is connected onto the transmission line 12M, and the gate of the FET 33M is connected onto the transmission line 12R The gate of the FET 33P corresponds to the voltage sensing unit 34M and the gate of the FET 33M corresponds to the voltage sensing unit 34P.

Next, an operation of a fifth embodiment will be described below. When the potential difference between the transmission lines 12P and 12M is small, since the potential difference between the source and gate of each of the FETs 33P and 33M is small, the FETs 33P and 33M are retained in an ON state. If the potential difference between the transmission lines 12P and 12M increases, the gate potential of one of the FETs is stepped up. If the gate potential exceeds the threshold voltage of the FETs 33, one of the FETs 33 is shifted to an OFF state. Since the impedance on the transmission line 12 increases, excess energy of a received signal will not reach the receiving circuit 16 but will be reflected to a transmitting side.

As mentioned above, according to a fifth embodiment, the impedance control circuit 32A has the FETs 33, which are inserted into the signal lines that are the transmission lines 12P and 12M, turned ON with a voltage equal to or lower than a threshold voltage. When the voltage of a received signal to be sensed by one of the voltage sensing units 34 exceeds the threshold voltage, one of the FETs 33 is shifted to the OFF state. Therefore, the impedance on the transmission line 12 can be increased and energy of the received signal can be reflected. Specifically, when the FETs 33 are of the depletion type, the sources of the FETs 33 are connected on the receiving circuit 16 side, and the gates thereof are connected onto the sides of the transmission lines 12M and 12P different from the sides thereof into which the FETs 33P and 33M are inserted. If the potential difference between the transmission lines 12M and 12P is small, the FETs 33 are retained in the ON state. Along with an increase in the potential difference, one of the FETs 33 is shifted to the OFF state.

Sixth Embodiment

Figure 11:
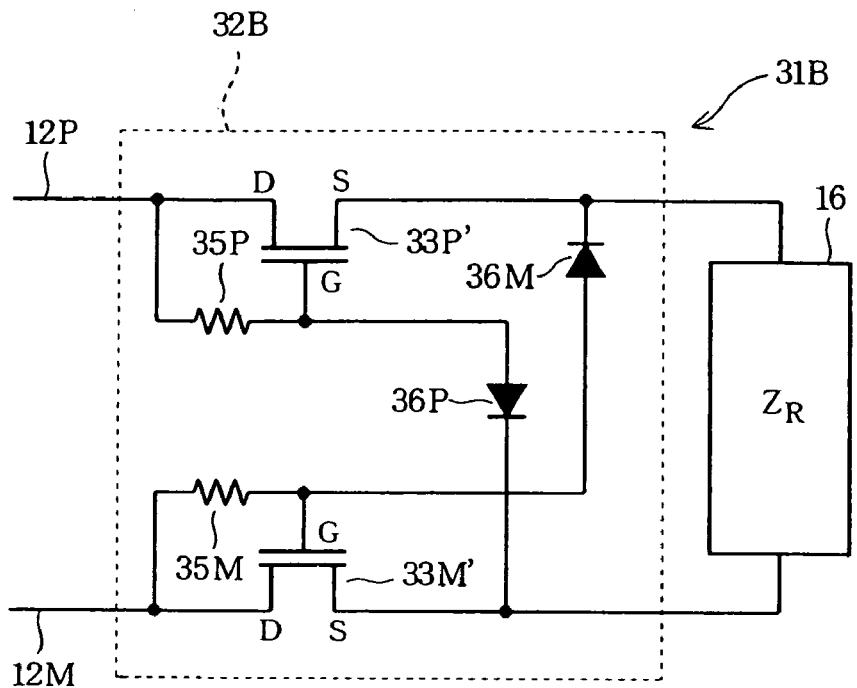
FIG. 11 is a diagram illustrating an exemplary impedance control circuit in accordance with a sixth embodiment.

FIG. 11 shows a sixth embodiment, and shows the constitution of an impedance control circuit 32B included in a receiving device 31B. In the present embodiment, FETs 33P' and 33M' are of the enhancement type. The gate of the FET 33P' is connected onto the drain side of the transmission line 12P via an on bias resistive element 35P included in a sensing unit, and is also connected onto the source side of the transmission line 12M via an off bias diode 36P included in the sensing unit. The gate of the FET 33M' is connected onto the drain side of the transmission line 12M via an on bias resistive element 35M, and is also connected onto the source side of the transmission line 12P via an off bias diode 36M.

Next, an operation of a sixth embodiment will be described. If the potential difference between the transmission lines 12P and 12M is small, the off bias diodes 36 are de-energized. The gate capacitors of the FETs 33' are charged via the resistive elements 35 each connected between the drain and gate of the FET. The potentials at the gates of the FETs 33' are higher than the potentials at the sources thereof. The FETs 33' are retained in the ON state. When the potential difference between the transmission lines 12P and 12M increases and exceeds the threshold, one of the diodes 36 is energized. One of the gate capacitors is therefore discharged. When the gate potential is stepped down to fall below the threshold voltage of the FETs 33', one of the FETs 33' is shifted to the OFF state. Accordingly, similarly to a fifth embodiment, the impedance on the transmission line 12 increases. Excess energy of a received signal will not reach the receiving circuit 16 but will be reflected to a transmitting side.

As mentioned above, according to a sixth embodiment, the impedance control circuit 32B employs the FETs 33', which can be enhancement-type FETs. The sources of the FETs 33' are connected to the receiving circuit 16 side. The gates of the FETs 33' are connected onto the sides of the transmission lines 12M and 12P respectively, which are different to the sides thereof into which the FETs are inserted, via the diodes 36, and are also connected to the sides of the drains thereof on the respective transmission lines via the resistive elements 35. Therefore, if the potential difference between the transmission lines 12M and 12P increases, one of the diodes 36 conducts to step down the gate potential of one of the FETs 33'. The FET 33' can be shifted to the OFF state.

Seventh Embodiment

Figure 12:
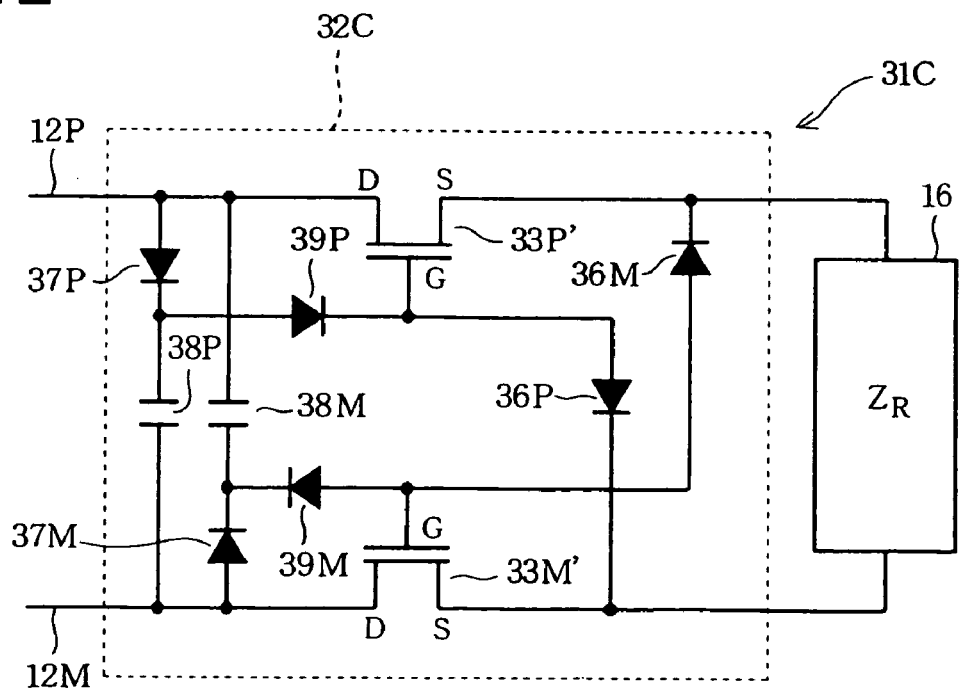
FIG. 12 is a diagram illustrating an exemplary impedance control circuit in accordance with a seventh embodiment.

FIG. 12 shows a seventh embodiment, or more particularly, shows the constitution of an impedance control circuit 32C included in a receiving device 31C. In a seventh embodiment, enhancement-type FETs 33P' and 33M' are employed similar to a sixth embodiment. However, the resistive elements 35 are excluded. A series circuit, including a diode 37P and a capacitor 38P and included in a step-up means of a sensing unit, is connected between the transmission lines 12P and 12M. A common junction point shared by the diode and capacitor is connected to the gate of the FET 33P' via a diode 39P included in the step-up means of the sensing unit. The same series circuit and diode are connected to the gate of the FET 33M' symmetrically to the above series circuit and diode.

Next, an operation of a seventh embodiment will be described. For example, when the potential difference between the transmission lines 12P and 12M increases, (1) if the diode 37P is energized, a current flows from the transmission line 12P to the transmission line 12M. The capacitor 38P is therefore charged. In such a state, when the potentials on the transmission lines 12P and 12M are reversed, if (2) the potential on the transmission line 12M gets higher than the potential on the transmission line 12P, a voltage that is substantially double the potential difference between the transmission line 12P and 12M and that is the sum of the potential difference between the signal lines and the charging voltage applied to the capacitor 38P is applied to the gate capacitor of the FET 33P' via the diode 39P. The FET 33P' is therefore turned ON.

Thereafter, the potential difference between the transmission lines 12P and 12M decreases, and the potential on the transmission line 12P gets higher than the potential on the transmission line 12M. The potential difference between the signal lines increases. When the potential difference becomes equal to or higher than a threshold, the diode 36P is energized and the gate capacitor of the FET 33P' is discharged. Since the gate potential of the FET 33P' is stepped down, the FET 33P' is turned OFF. The actions on the FET 33M' side are performed in the same manner as the foregoing actions except that the magnitudes of potentials on the transmission lines 12P and 12M are reversed.

According to a seventh embodiment, the portions of an exemplary step-up means are included for stepping up voltages generated on the transmission lines 12P and 12M respectively, and applying the resultant voltages to the gates of the FETs 33'. Specifically, each of the portions of an exemplary step-up means includes the series circuit, including the diode 37 and capacitor 38 connected between the signal lines constituting the transmission line 12, and the diode 39 connected between the common junction point in the series circuit and the gate of the FET 33'. Therefore, even when the threshold voltage of the FETs 33' is set to a relatively large value, the FETs 33' can be reliably shifted from the on state to the OFF state.

Eighth Embodiment

Figure 13:
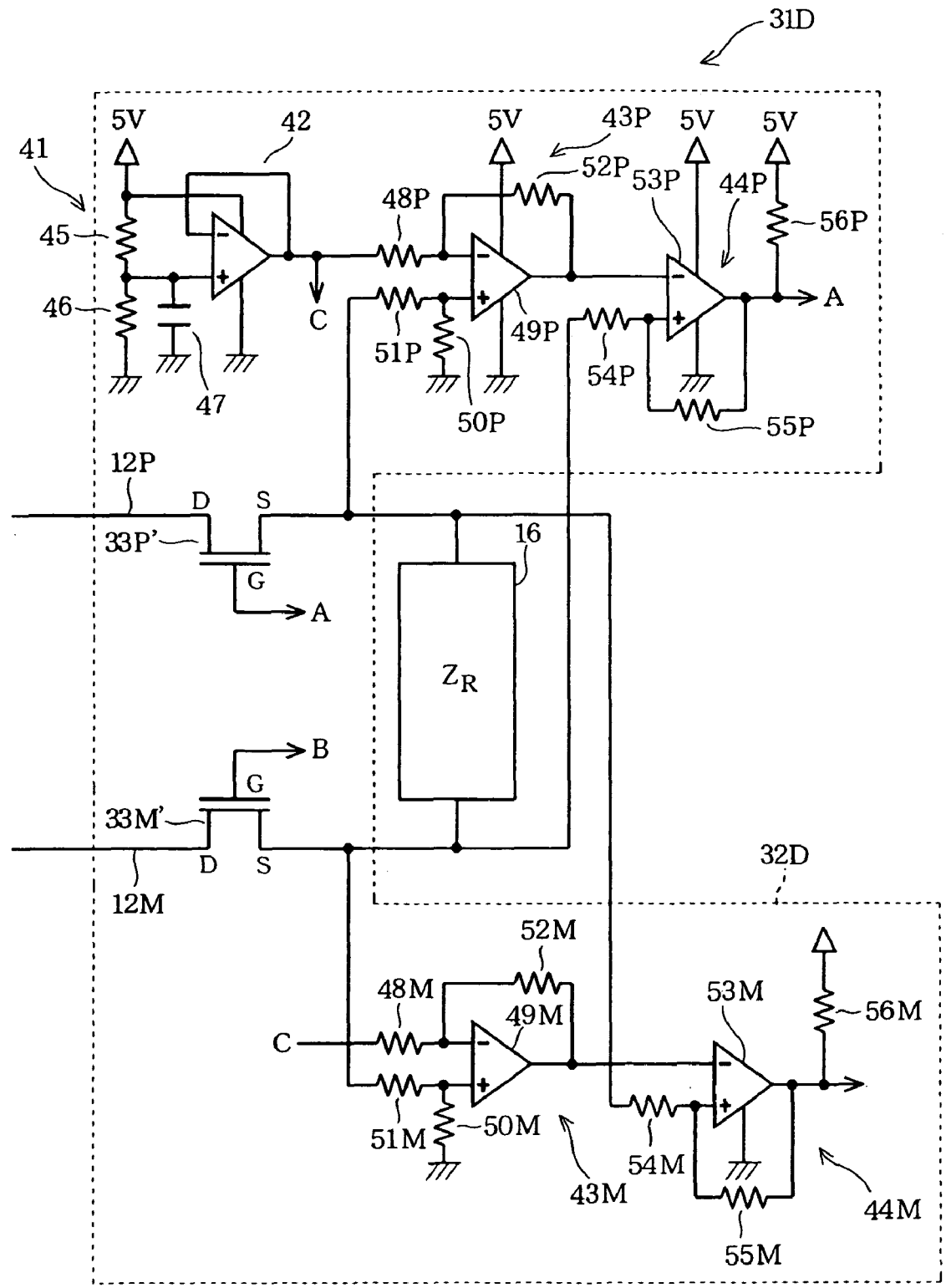
FIG. 13 is a diagram illustrating an exemplary impedance control circuit in accordance with an eighth embodiment.

FIG. 13 shows an eighth embodiment, or more particularly, shows the constitution of an impedance control circuit 32D included in a receiving device 31D. The impedance control circuit 32D includes a voltage division circuit 41 serving as a reference voltage production means, a voltage follower 42, subtraction circuits 43 serving as portions of an exemplary potential difference output means, and comparison circuits 44 serving as portions of an exemplary comparison means. These circuits constitute a sensing unit. The voltage division circuit 41 and voltage follower 42 are circuits connected in common with the transmission lines 12P and 12M. The subtraction circuits 43 and comparison circuits 44 are connected onto the respective transmission lines 12P and 12M. P or M will not be appended to the reference numerals denoting the circuits unless discrimination is especially needed.

The voltage division circuit 41 is realized with a series circuit including resistive elements 45 (R1) and 46 (R2) connected between a 5 V power supply and a ground. A common junction point shared by the resistive elements is connected to the non-inverting input terminal of an operational amplifier realizing the voltage follower 42. A high-frequency noise removing capacitor 47 is connected in parallel with the resistive element 46. The output terminal of the voltage follower 42 is connected to the inverting input terminal of the operational amplifier, and also connected to the inverting input terminals of operational amplifiers 49, which are included in the respective subtraction circuits 43, via resistive elements 48.

The non-inverting input terminals of the operational amplifiers 49 are connected to the ground via resistive elements 50. The non-inverting input terminal of the operational amplifier 49P is connected to the source of the FET 33P' via a resistive element 51P, and the non-inverting input terminal of the operational amplifier 49M is connected to the source of the FET 33M' via a resistive element 51M. The output terminals of the operational amplifiers 49 are connected to the inverting input terminals thereof via resistive elements 52, and also connected to the inverting input terminals of comparators 53 included in the respective comparison circuits 44.

The non-inverting input terminal of the comparator 53P is connected to the source of the FET 33M' via a resistive element 54P, and the non-inverting input terminal of the comparator 53M is connected to the source of the FET 33P' via a resistive element 54M. The output terminals of the comparators 53 are connected to the non-inverting input terminals thereof via resistive elements 55, and also connected to the 5 V power supply via resistive elements 56 for the purpose of pull-up. The output terminal of the comparator 53P is connected to the gate of the FET 33P', and the output terminal of the comparator 53M is connected to the gate of the FET 33M'.

An operation of an eighth embodiment will be described below. The voltage division circuit 41 produces as a reference voltage that is a fraction of a voltage of 5 V produced by the resistive elements 45 and 46. The reference voltage can be expressed as 5V×R2/(R1+R2). The reference voltage is output to the subtraction circuits 43 via the voltage follower 42. The subtraction circuit 43P outputs a difference voltage between the potential on the transmission line 12P and the reference voltage to the comparison circuit 44P, and the subtraction circuit 43M outputs a difference voltage between the potential on the transmission line 12M and the reference voltage to the comparison circuit 44M.

The comparison circuit 44P compares the difference voltage provided by the subtraction circuit 43P, with the potential on the transmission line 12M. If the former gets considerably larger than the latter, the comparison circuit 44P changes an output level from a high level to a low level causing the FET 33P' to shift from an ON state to an OFF state. Likewise, the comparison circuit 44M compares the difference voltage provided by the subtraction circuit 43M, with the potential on the transmission line 12R If the former gets larger than the latter, the comparison circuit changes an output level from the high level to the low level, and causes the FET 33M' to shift from the ON state to the OFF state.

As mentioned above, according to an eighth embodiment, the subtraction circuits 43P and 43M each output the difference voltage between the reference voltage and the potential on the transmission line 12P or 12M to which the FET 33P' or FET 33M' is inserted. The comparison circuits 44P and 44M each compare the difference voltage, which is outputted from the subtraction circuit 43P or 43M, with the potential on the transmission line 12M or 12P opposite to the transmission line to which the FET 33P' or FET 33M' is inserted, and outputs the result of the comparison to the gate of the FET 33P' or FET 33M'. Therefore, a potential reference based on which the FETs 33' are shifted from the ON state to the OFF state and received energy is reflected can be reliably designated by the voltage division circuit 41.

Ninth Embodiment

Figure 14:
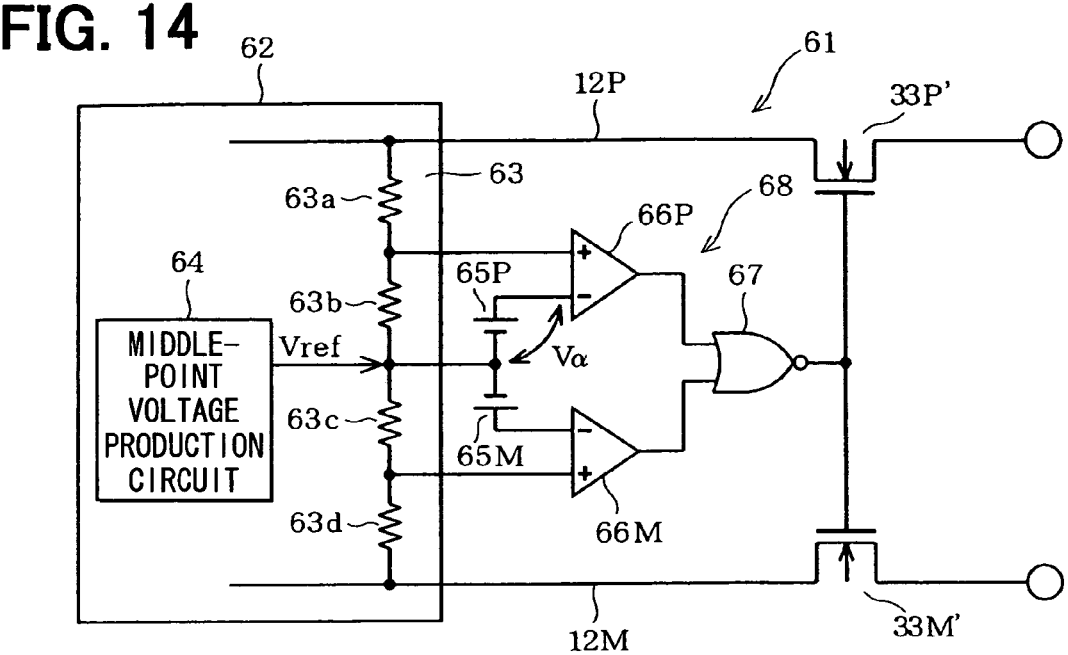
FIG. 14 is a diagram illustrating an exemplary constitution of a receiving device of a ninth embodiment.

FIG. 14 shows a ninth embodiment. A receiving device 61 of a ninth embodiment senses a current flowing over the transmission line 12. If the sensed current exceeds a predetermined threshold, the receiving device 61 changes the impedance on the transmission line 12. A receiving circuit 62 includes a voltage division resistive circuit 63 that is including resistive elements 63a to 63d connected between the transmission lines 12P and 12M, that is included in a sensing unit, and that serves as a voltage conversion means. The receiving circuit 16 includes a middle-point voltage production circuit 64 realized with, for example, a band gap reference circuit. A middle-point voltage Vref produced by the middle-point voltage production circuit 64 is applied to a common junction point shared by the resistive elements 63b and 63c included in the voltage division resistive circuit 63.

The common junction point shared by the resistive elements 63b and 63c is connected to the inverting input terminals of comparators 66P and 66M included in a sensing unit and serving as comparison circuits, via offset voltage sources 65P and 65M serving as reference voltage production circuits. The non-inverting input terminal of the comparator 66P is connected to the common junction point shared by the resistive elements 63a and 63b, and the non-inverting input terminal of the comparator 66M is connected to the common junction point shared by the resistive elements 63c and 63d. The output terminals of the comparators 66P and 66M are connected to the input terminals of a NOR gate 67, and the output terminal of the NOR gate 67 is connected in common with the gates of the FETs 33P' and 33M'.

In the foregoing constitution, the FETs 33', voltage division resistive circuit 63, middle-point voltage production circuit 64, offset voltage sources 65, comparators 66, and NOR gate 67 constitute an impedance control circuit 68 corresponding to an impedance control means.

An operation of a ninth embodiment will be described below. If no signal is transmitted over the transmission line 12, the transmission lines 12P and 12M has no potential difference. The potentials on the transmission lines 12P and 12M correspond to the middle-point voltage Vref with respect to a ground potential. At the present time, the output signals of the comparators 66P and 66M have a low level and the output level of the NOR gate 67 is a high level. Therefore, the FETs 33P' and 33M' are ON.

In the above described state, if the potential on, for example, the transmission line 12P becomes higher than the potential on the transmission line 12M, a current is caused to flow into the voltage division resistive circuit 63 included in the receiving circuit 62. A potential difference is produced across the resistive element 63b. If the potential difference exceeds an offset voltage Vα fed from the offset voltage source 65P and that serves as a reference voltage, the output signal of the comparator 66P changes to the high level. The FETs 33P' and 33M' are thereby turned OFF. In contrast, if the potential on the transmission line 12M becomes higher than the potential on the transmission line 12P, the resistive element 63c, comparator 66M, and offset voltage source 65M performs actions as described above on the opposite symmetrical circuit portion side associated with transmission line 12M.

According to a ninth embodiment, the voltage division resistive circuit 63 incorporated in the receiving circuit 62 converts a current flowing over the transmission line 12, into a voltage. The comparators 66P and 66M each feed an output signal resulting from the comparison of the converted voltage with the offset voltage Vα fed by the offset voltage source 65P or 65M, to the gate of the FET 33P' or 33M'. If the current flowing over the transmission line 12 increases, the FETs 33P' and 33M' can be shifted to the OFF state in order to increase the impedance on the transmission line.

Tenth Embodiment

Figure 15:
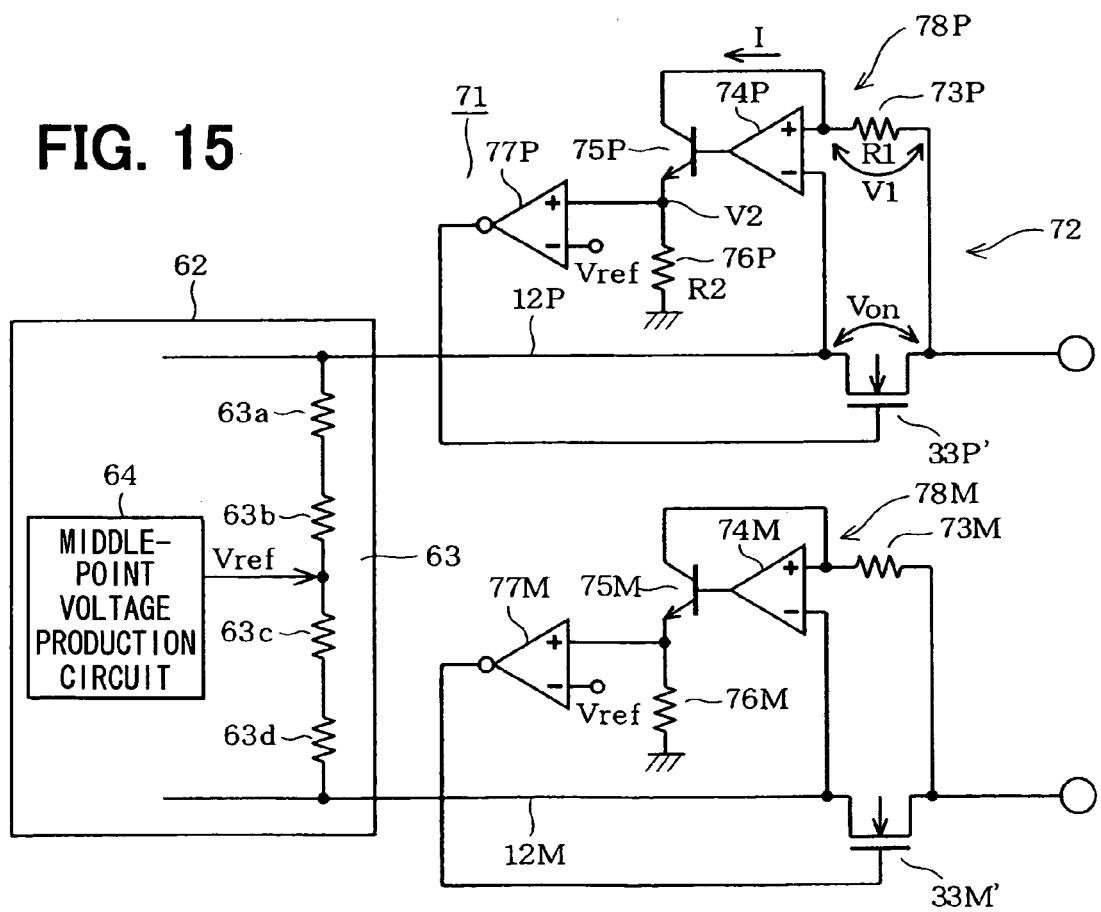
FIG. 15 is a diagram illustrating an exemplary constitution of a receiving device of a tenth embodiment.

FIG. 15 shows a tenth embodiment. A difference from a ninth embodiment will be described below. A receiving device 71 of a tenth embodiment includes a receiving circuit 62 and impedance control circuits 72 serving as portions of an exemplary impedance control means including sensing units. The impedance control circuits 72 each detect a current flowing over the transmission line 12, on the basis of an ON voltage at one of the FETs 33' that serve voltage conversion elements and are included in portions of an exemplary voltage conversion means.

The drain of each of the FETs 33' which is a high-potential side terminal is connected to the non-inverting input terminal of an operational amplifier 74 via a first resistive element 73 (R1), and the source thereof which is a low-potential side terminal is connected to the inverting input terminal of the operational amplifier 74. The non-inverting input terminal of the operational amplifier 74 is connected to the collector of a transistor 75, such as an NPN transistor, and the output terminal of the operational amplifier 74 is connected to the base of the transistor 75. The emitter of the transistor 75 is connected to a ground via a second resistive element 76 (R2), and also connected to the non-inverting input terminal of a comparator 77.

A middle-point voltage Vref produced by a middle-point voltage production circuit 64 is applied to the inverting input terminals of the comparators 77. The comparators 77 provide a negative-logic output. The output terminals of the comparators 77 are connected to the gates of the FETs 33'. In the foregoing constitution, the first resistive element 73, operational amplifier 74, transistor 75, and second resistive element 76 constitute an amplification circuit 78 included in the voltage conversion means.

Next, an operation of a tenth embodiment will be described below. If the FETs 33' are ON, an ON voltage Von determined with an ON resistance Ron of the FET 33' and a drain current Id are present between the source of each of the FETs 33' and the respective drains. Due to the operation of each of the operational amplifiers 74, the potential at the non-inverting input terminal is controlled to be equal to the source potential of each of the FETs 33'. The terminal voltage V1 of each of the first resistive elements 73 therefore becomes equal to the ON voltage Von.

Assuming that a current I is flowing to the collector of each of the transistors 75 via each of the first resistive elements 73, V1=Von=R1×I is established. The current I flows into each of the second resistive elements 76. The terminal voltage V2 of each of the second resistive elements 76 is expressed as V2=R2×I. Since I=Von/R1, the expression V2=(R2/R1)×Von can be established.

An amplified voltage produced by multiplying the ON voltage Von of each of the FETs 33' by R2/R1 is outputted to the non-inverting input terminal of each of the comparators 77. When V2>Vref is established, each of the comparators 77 changes the output level thereof from the high level to the low level. The FETs 33' are therefore shifted from the ON state to the OFF state.

As mentioned above, according to a tenth embodiment, a current flowing over the transmission line 12 is converted into the ON voltage Von using the ON resistance Ron of one of the FETs 33'. The voltage Von is amplified by one of the amplification circuits 78 and outputted to one of the comparators 77. Even when the level of the current flowing over the transmission line 12 is low, sensing can be reliably achieved. The FETs 33' are each used as a voltage conversion element to convert the line current into a voltage.

Eleventh Embodiment

Figure 16:
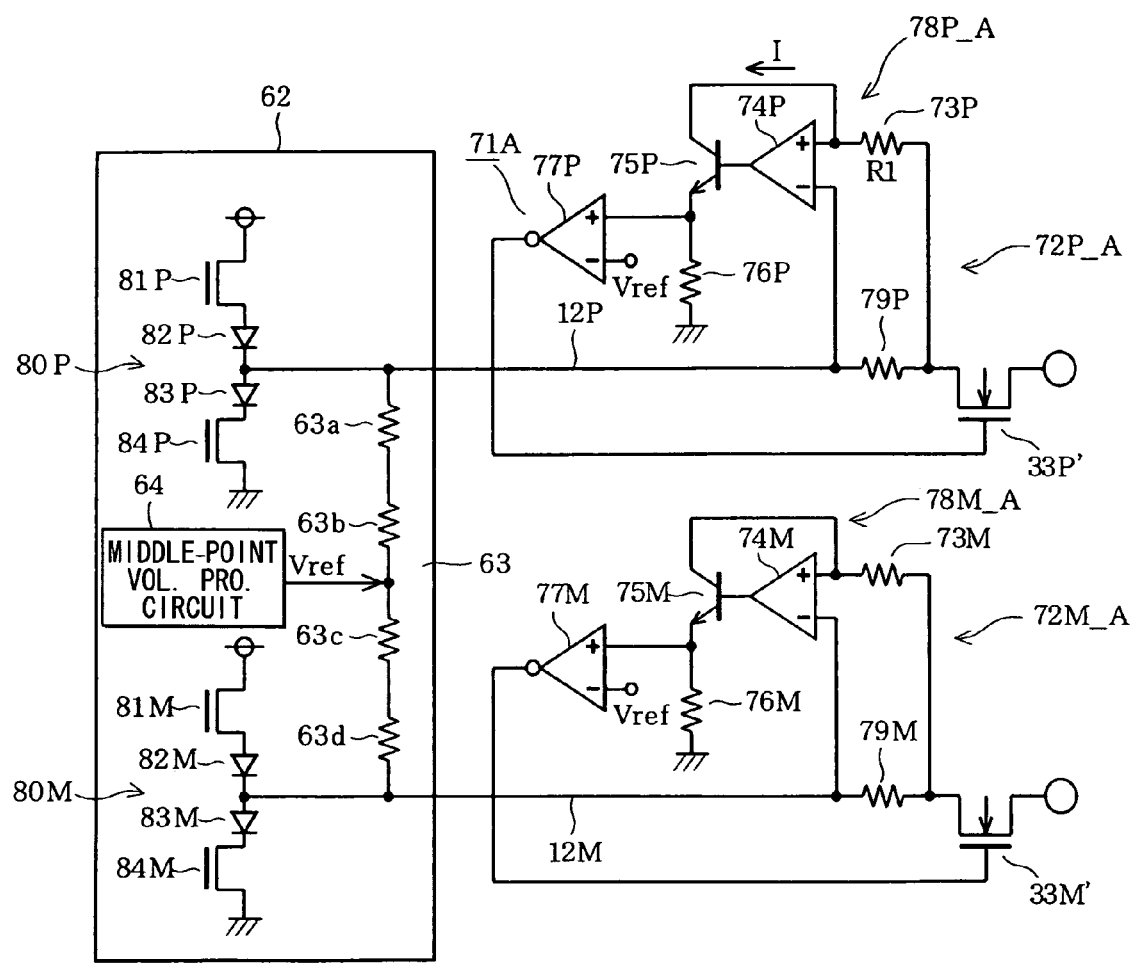
FIG. 16 is a diagram illustrating an exemplary constitution of a receiving device of an eleventh embodiment.

FIG. 16 shows an eleventh embodiment. Only a difference from a tenth embodiment will be described below. A receiving device 71A of an eleventh embodiment includes impedance control circuits 72A, or more particularly, 72P_A and 72M_A each of which uses a shunt resistive element 79 connected in series with an FET 33' as a voltage conversion element, though each of the impedance control circuits 72 included in a tenth embodiment uses the FET 33' as the voltage conversion element. The other components are identical to those of a tenth embodiment. Therefore, amplification circuits 78A are identical to the amplification circuits 78 included in a tenth embodiment except the reference numerals.

In FIG. 16, drivers 80, used when a receiving circuit 62 functions as a transmitting circuit, are shown. Each of the drivers 80 includes a series circuit including a p-channel MOSFET 81 and a diode 82 connected between a 5 V power supply and the transmission line 12, and a series circuit including a diode 83 and a n-channel MOSFET 84 connected between the transmission line 12 and a ground. When a signal is transmitted over the transmission line 12, one of the FETs 81 and 84 is turned ON. In such a case, the ON or OFF states of the FETs are reversed depending on whether the FETs are connected onto the transmission line 12P or 12M.

According to an eleventh embodiment constituted as mentioned above, since the shunt resistive elements 79 connected in series with the respective FETs 33' are used as voltage conversion elements, highly precise current sensing can be achieved on the basis of a predetermined resistance, compared with current sensing performed using the ON resistance of each of the FETs 33' according to a tenth embodiment.

Twelfth Embodiment

Figure 17:
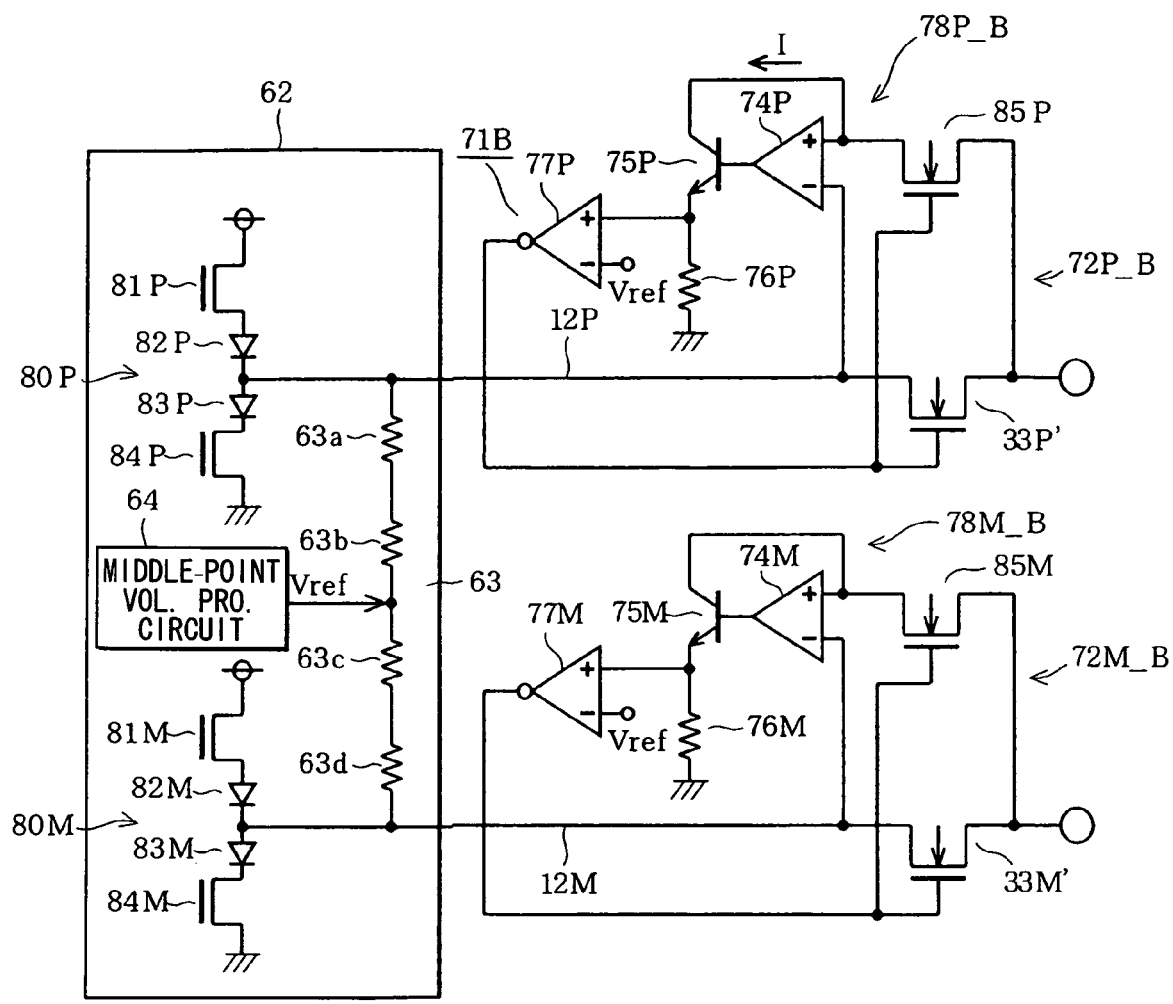
FIG. 17 is a diagram illustrating an exemplary constitution of a receiving device of a twelfth embodiment.
Figure 18:
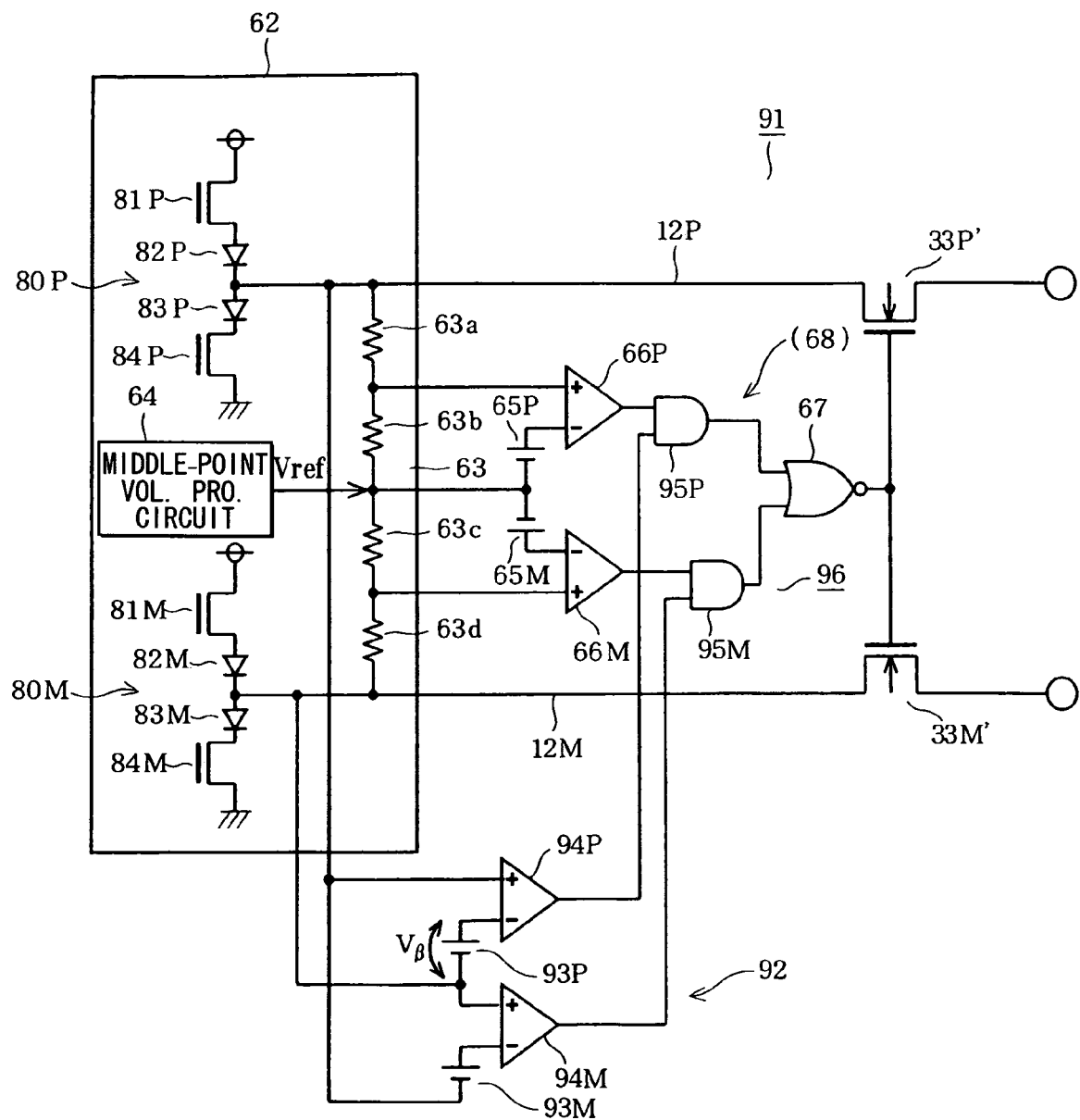
FIG. 18 is a diagram illustrating an exemplary constitution of a receiving device of a thirteenth embodiment.

FIG. 17 shows a twelfth embodiment. A difference from a tenth embodiment will be described below. A receiving device 71B of a twelfth embodiment includes impedance control circuits 72B each of which includes an n-channel MOSFET 85 or a second FET in place of the first resistive element 73 included in each of the impedance control circuits 72 of a tenth embodiment. The gate and drain of each of the FETs 85 are connected in common with the gate and drain of each of FETs 33' that are first FETs. The sources of the FETs 85 are connected to the non-inverting input terminals of the respective operational amplifiers 74.

The FETs 85 each feed a drain current that occupies a small ratio with respect to a drain current flowing through the FET 33' and serve as so-called current sensing FETs. The other components are identical to those of a tenth embodiment. Therefore, each of amplification circuits 78B is constituted by substituting the FET 85 for the first resistive element 73 included in each of the amplification circuits 78 included in a tenth embodiment.

According to a twelfth embodiment constituted as mentioned above, the amplification circuits 78B are constituted by substituting the current sensing FETs 85 for the first resistive elements 73 included in the respective amplification circuits 78. An advantage of a tenth embodiment can be provided.

Thirteenth Embodiment

Thirteenth to sixteenth embodiments to be described below are designed to sense a power transmitted over the transmission line 12 by adding the circuitry that senses a voltage on the transmission line 12, in accordance with, for example, a ninth to twelfth embodiments, in which the sensing unit senses a current flowing over the transmission line 12. Specifically, a receiving device 91 of a thirteenth embodiment is constituted by adding a voltage comparison block 92 included in a sensing unit, to the impedance control circuit 68, for example as associated with a ninth embodiment, which serves as a current comparison unit.

The voltage comparison block 92 includes offset voltage sources 93P and 93M that have the negative terminals thereof connected to the transmission lines 12M and 12P respectively, and comparators 94P and 94M that have the non-inverting input terminals thereof connected to the transmission lines 12P and 12M respectively and have the inverting input terminals thereof connected to the positive terminals of the offset voltage sources 93P and 93M respectively.

AND gates 95P and 95M are inserted between comparators 66P and 66M and a NOR gate 67 which are included in the impedance control circuit 68. The output terminals of the comparators 94P and 94M are connected to the other input terminals of the AND gates 95P and 95M respectively. The voltage comparison block 92 and AND gates 95 are added to the impedance control circuit 68, whereby an impedance control circuit 96 that serves as an impedance control circuit including a sensing unit is constituted.

An operation of a thirteenth embodiment will be described below. The impedance control circuit 96 senses a current flowing over the transmission line 12, in the same manner as the impedance control circuit 68 of a ninth embodiment. In the voltage comparison block 92, when the potential on the transmission line 12P is stepped up by more than an offset voltage Vβ, serving as a reference voltage or a threshold, and is fed from the offset voltage source 93P connected onto the transmission line 12P, with the potential on the transmission line 12M as a reference, the comparator 94P changes the output level thereof from a low level to a high level. When the potential on the transmission line 12M is stepped up by more than the offset voltage Vβ fed from the offset voltage source 93M, with the potential on the transmission line 12P as a reference, the comparator 94M changes the output level thereof from the low level to the high level.

When the result of current comparison performed by the impedance control circuit 96 demonstrates that the current exceeds the threshold and the result of voltage comparison performed by the voltage comparison block 92 demonstrates that the potential exceeds the threshold, one of the AND gates 95 changes the output level thereof into the high level. As a result, when the power of a signal sent over the transmission line 12 exceeds the threshold, the impedance control circuit 96 shifts one of the FETs 33' from the ON state to the OFF state.

According to a thirteenth embodiment, the impedance control circuit 96 includes the voltage comparison block 92 that outputs a result of comparison of the potential on the transmission line 12 with the reference voltage. An AND conditional signal representing the AND of the result of comparison performed based on a current flowing over the transmission line 12, by the impedance control circuit 96, and the result of comparison performed by the voltage comparison block 92 is outputted to the gate of one of the FETs 33'. The impedance control circuit 96 equivalently senses the power of a signal sent over the transmission line 12. The energy of a received signal can be more accurately assessed.

In the above described case, the voltage comparison block 92 compares the potential on one of the transmission lines 12P and 12M with the reference voltage for comparison that is the sum of the potential on the other one of the transmission lines 12M and 12P and the predetermined offset voltage Vβ. Therefore, an incident that the potential on one of the transmission lines 12P and 12M is stepped up to exceed the potential on the other one of the transmission lines 12M and 12P by more than the offset voltage Vβ can be sensed.

Fourteenth Embodiment

Figure 19:
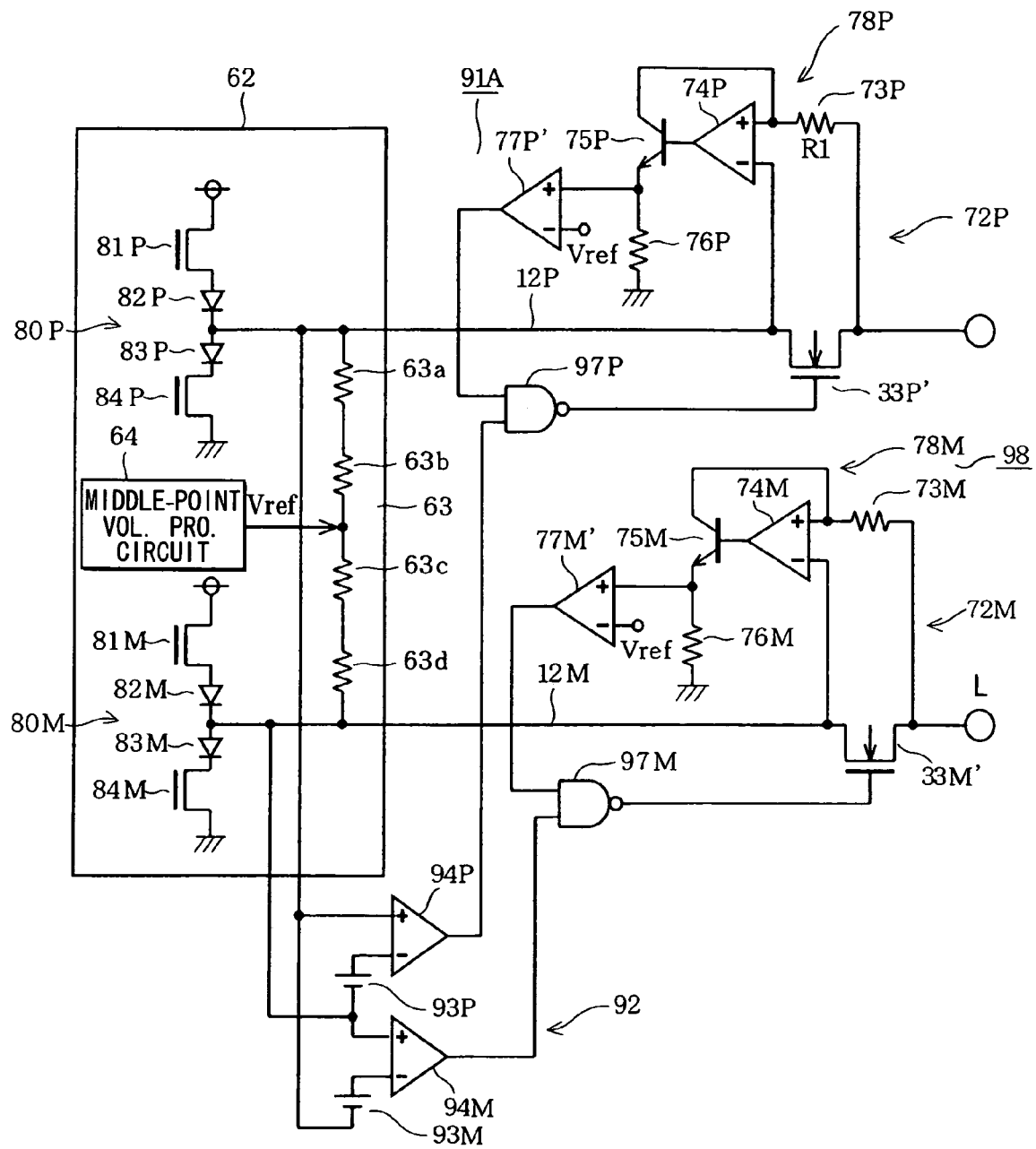
FIG. 19 is a diagram illustrating an exemplary constitution of a receiving device of a fourteenth embodiment.

FIG. 19 shows a fourteenth embodiment. A receiving device 91A of a fourteenth embodiment has the voltage comparison block 92 added to the impedance control circuits 72 which are included in a tenth embodiment and serve as current comparison units. The comparators 77 are replaced with comparators 77' that provide a positive-logic output. The output signals of the comparators 77' and the output signals of the comparators 94 are applied to the gates of the respective FETs 33' via NAND gates 97. These components constitute an impedance control circuit 98 that serves as an impedance control means including a sensing unit.

According to a fourteenth embodiment constituted as mentioned above, the impedance control circuits 72 operate in the same manner as those included in a tenth embodiment. The voltage comparison block 92 operates in the same manner as that included in a thirteenth embodiment. The results of comparisons performed by the impedance control circuit and voltage comparison block are treated by each of the NAND gates 97. Therefore, the FETs 33' are controlled to be turned ON or OFF under the AND condition. Eventually, the same advantage as that of a thirteenth embodiment can be provided.

Fifteenth Embodiment

Figure 20:
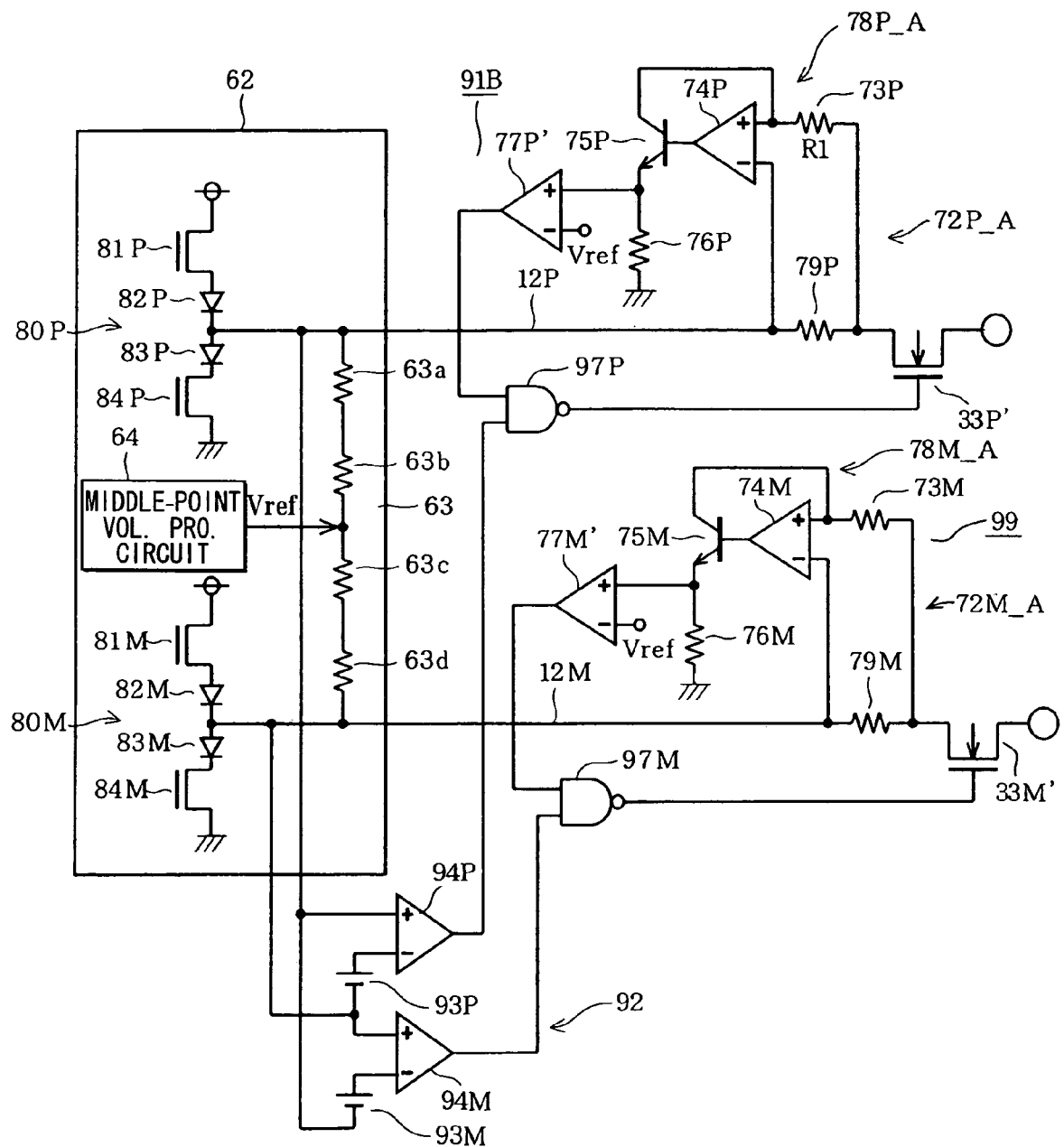
FIG. 20 is a diagram illustrating an exemplary constitution of a receiving device of a fifteenth embodiment.

FIG. 20 shows a fifteenth embodiment. A receiving device 91B of a fifteenth embodiment has the voltage comparison block 92 added to the impedance control circuits 72A that are included in an eleventh embodiment and serve as current comparison units. The comparators 77 are replaced with comparators 77', which provide a positive-logic output, in the same manner as those in a fourteenth embodiment. The output signals of the comparators 77' and the output signals of the comparators 94 are applied to the gates of the respective FETs 33' via the NAND gates 97 in the same manner as those in a thirteenth embodiment. These components constitute an impedance control circuit 99 that serves as an impedance control means including a sensing unit.

According to a fifteenth embodiment constituted as mentioned above, the impedance control circuits 72A operate in the same manner as those included in an eleventh embodiment. The voltage comparison block 92 operates in the same manner as that included in a thirteenth embodiment. The FETs 33' are controlled to be turned ON or OFF under the condition of the AND of the results of comparisons performed by the impedance control circuit and voltage comparison block. Eventually, the same advantage as that of a thirteenth embodiment can be provided.

Sixteenth Embodiment

Figure 21:
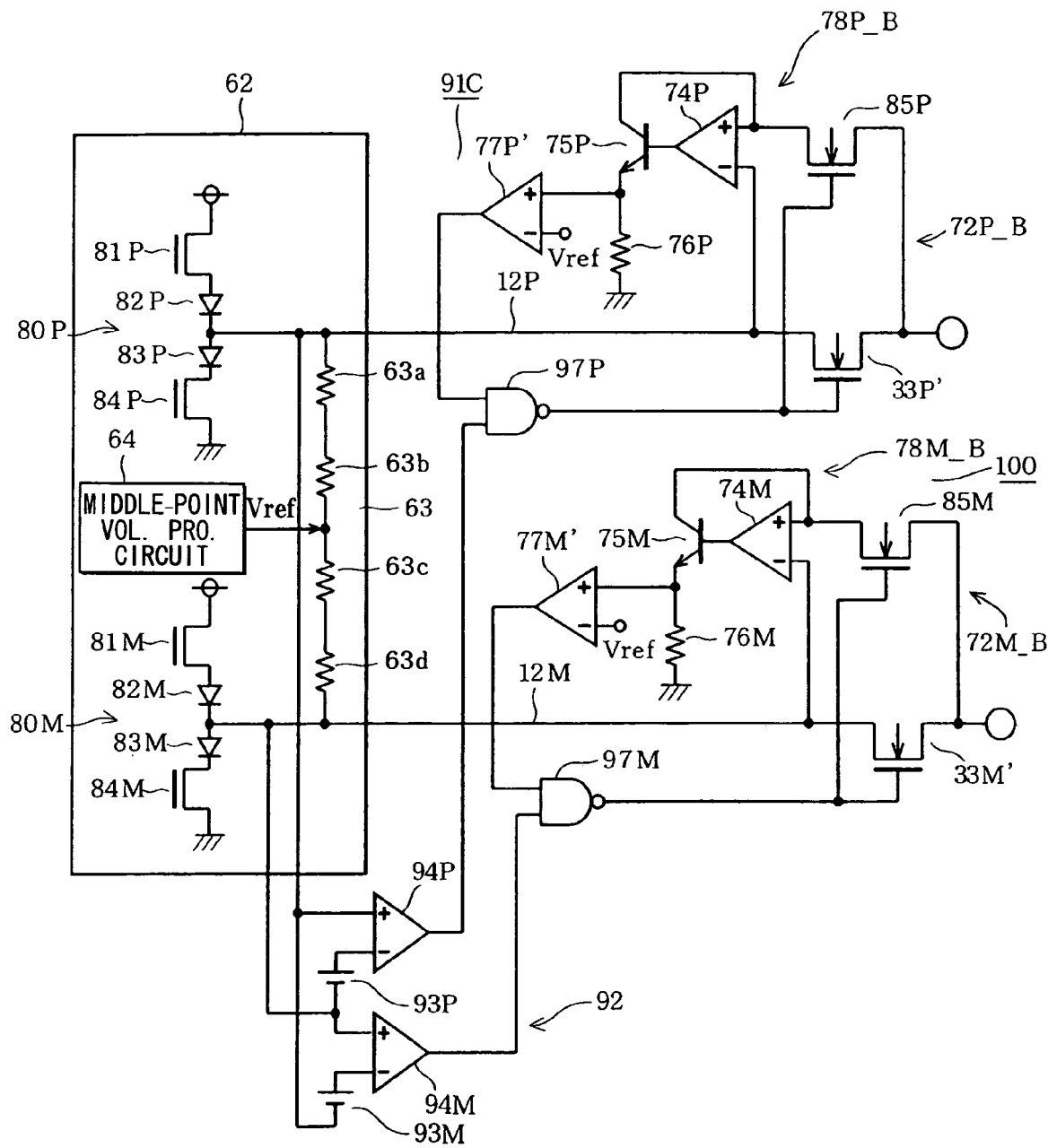
FIG. 21 is a diagram illustrating an exemplary constitution of a receiving device of a sixteenth embodiment.

FIG. 21 shows a sixteenth embodiment. A receiving device 91C of a sixteenth embodiment has the voltage comparison block 92 added to the impedance control circuits 72B that are included in a twelfth embodiment and serve as current comparison units. The other components are identical to those of a fifteenth embodiment. These components constitute an impedance control circuit 100 that serves as an impedance control means including a sensing unit.

According to a sixteenth embodiment constituted as mentioned above, the impedance control circuits 72B operate in the same manner as those included in a twelfth embodiment, and the voltage comparison block 92 operates in the same manner as that included in a thirteenth embodiment. The FETs 33' are controlled to be turned ON or OFF under the condition of the AND of the results of comparisons performed by the impedance control circuit and the voltage comparison block respectively. The same advantage as that of a thirteenth embodiment can be provided.

Seventeenth Embodiment

Figure 22:
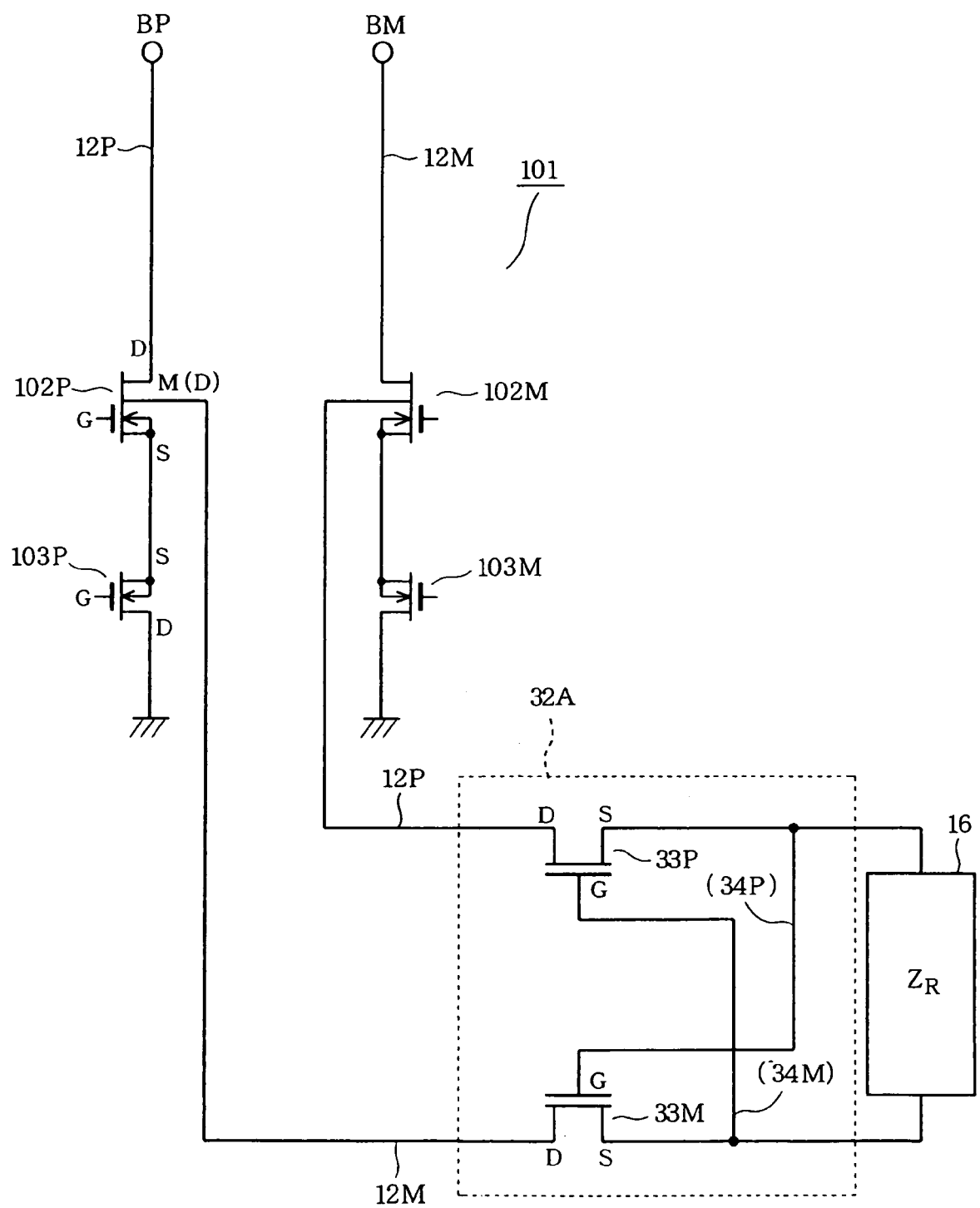
FIG. 22 is a diagram illustrating an exemplary constitution of a receiving device of a seventeenth embodiment.
Figure 23:
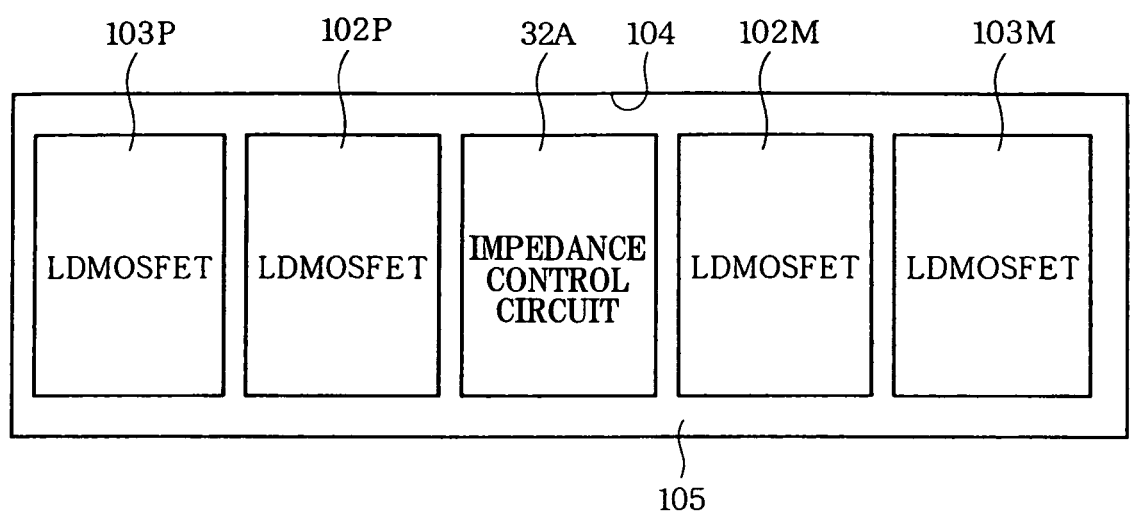
FIG. 23 is a diagram illustrating a plan view of an exemplary formed state of semiconductor elements.
Figure 24:
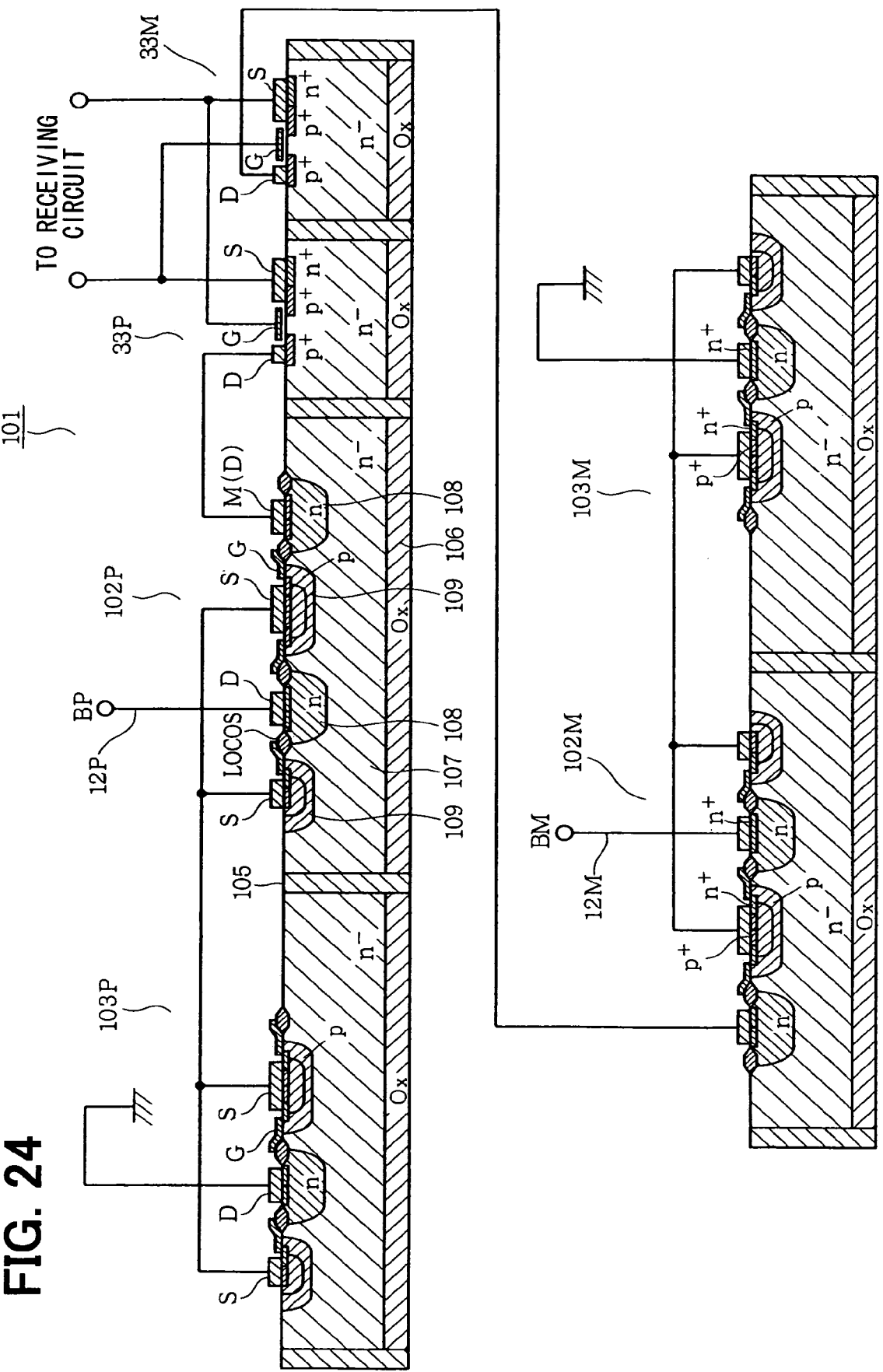
FIG. 24 is a diagram illustrating a sectional view an exemplary semiconductor structure.

FIG. 22 to FIG. 24 show a seventeenth embodiment. A receiving device 101 of a seventeenth embodiment has n-channel MOSFETs 102P and 102M, which are first FETs, and n-channel MOSFETs 103P and 103M, which are second FETs, added as anti-overvoltage protection elements to the circuitry of a fifth embodiment shown in FIG. 10. The drains of the FETs 102 are connected to the transmission line 12, and the sources of each pair of the FETs 102 and FETs 103 are connected in common with each other.

The drains of the FETs 103 serving as overcurrent bypass terminals are grounded, and the gates of the FETs 102 and 103 are left open. Assuming that the foregoing drains of the FETs 102 are regarded as the first drains, the FETs 102 have the other second drains. The second drains serving as signal transmission terminals are connected to the drains of the FETs 33 included in an impedance control circuit 32A.

The FETs 102 and FETs 103 are fabricated as laterally defused (LD) MOSFETs. FIG. 23 is a plan view showing a formed state of the semiconductor elements as well as the impedance control circuit 32A. In FIG. 23, the impedance control circuit 32A is disposed in the center, the FETs 102P and 102M are disposed on both sides of the impedance control circuit. The FETs 103P and 103M are disposed outside the FETs 102P and 102M respectively. Formed regions of the circuit and elements are isolated and separated from one another using an insulating material 105 such as SiO₂ (Ox) filled in a trench 104, that is, separated from one another by the trench.

FIG. 24 shows a semiconductor structure including the FETs 102, FETs 103, and FETs 33. The FETs are fabricated to have a silicon-on-insulator (SOI) structure. An n- layer 107 that is a low-density n-type layer and serves as a substrate layer is placed on an Ox layer 106 made of an insulating material and serves as an insulating part having a silicon substrate oxidized. As for the FETs 102 and FETs 103, the drain electrodes are formed in n-type layers 108 formed on the n- layer 107, and the source electrodes are formed in p-type layers or p wells 109.

However, the first drain of each of the FETs 102 is formed in one of the two n-type layers 108 and connected onto the transmission line 12, and the second drain (M) is formed in the other n-type layer 108 and connected to the drain of one of the FETs 33 as mentioned above.

Next, an operation of a seventeenth embodiment will be described. In a normal state, a signal sent over the transmission line 12 is transmitted from the first drain of one of the FETs 102 to the second drain thereof through the n- layer 107, and propagated to the drain of one of the FETs 33. If an overvoltage, for example, an electric static discharge (ESD) is applied to the transmission line 12, the gate potential of the FET 102 is stepped up because it is coupled with the potential at the first drain thereof. The channel of the FET 102 therefore conducts. The impedance between the drain and source of the FET 102 decreases, and a surge current flows into one of the FETs 103.

Since the overvoltage reacts on the gate of the FET 103, which remains open, the channel of the FET conducts. The impedance between the drain and source of the FET 103 decreases, and the surge current flows safely into a ground. The first drain of the FET 102 and the second drain thereof are linked via the low-density n- layer 107. The resistance between the first and second drains of the FET 102 is therefore relatively high. The surge current will not flow into the FET 33.

As mentioned above, according to a seventeenth embodiment, each pair of the FETs 102 and FETs 103 is connected in series with each other as an anti-overvoltage protection element between the transmission line 12 and one of the FETs 33 included in the impedance control circuit 32A. When an overvoltage is applied to the transmission line 12, the gate potentials of one pair of the FETs 102 and 103 are stepped up. A surge current is therefore routed to a ground, and the FETs 33 and receiving circuit 16 can be protected from the overvoltage. In this case, since the gates of the FETs 102 and FETs 103 are left open, anti-overvoltage protection can be achieved with a simpler constitution.

Since the FETs 33, FETs 102, and FETs 103 are formed in regions isolated from one another by an insulating material. The dielectric strength of the insulating material among elements can be improved. A dielectric breakdown derived from application of the overvoltage can be prevented.

Eighteenth Embodiment

Figure 25:
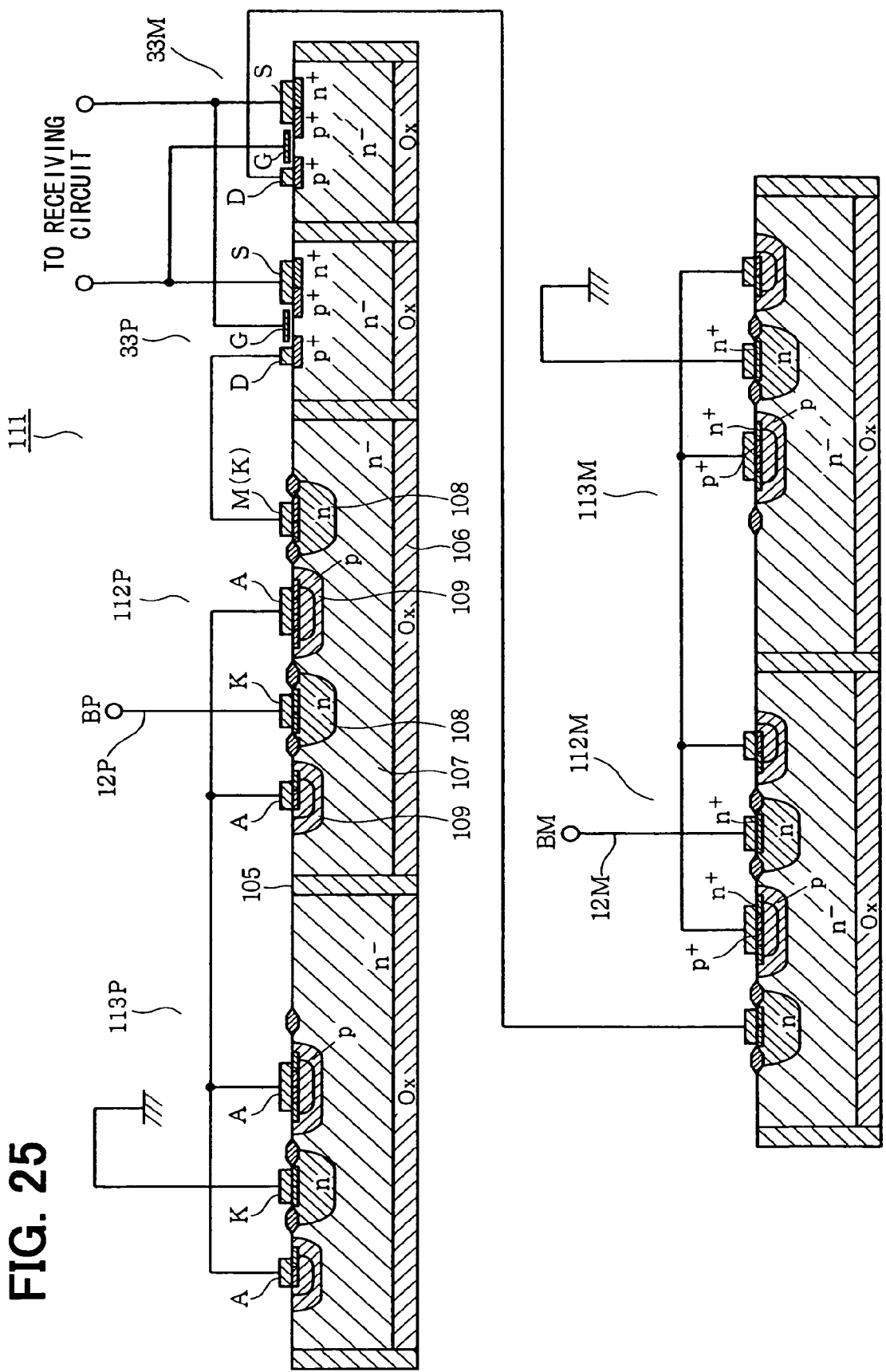
FIG. 25 is a diagram illustrating an exemplary constitution in accordance with an eighteenth embodiment.

FIG. 25 shows an eighteenth embodiment. A difference from a seventeenth embodiment will be described below. FIG. 25 is equivalent to FIG. 24 showing a seventeenth embodiment. In a receiving device 111 of an eighteenth embodiment, the anti-overvoltage protection elements are changed from the FETs 102 and FETs 103 to diodes 112 or first diodes and diodes 113 or second diodes. The diodes 112 and diodes 113 shown in FIG. 25 have the structures having the gate electrodes excluded from the structures of the FETs 102 and FETs 103 included in a seventeenth embodiment. The drain of the FET corresponds to the cathode of the diode, and the source of the FET corresponds to the anode of the diode.

Next, an operation of an eighteenth embodiment will be described below. In a normal state, a signal sent over the transmission line 12 is transmitted from the first cathode of one of the diodes 112 to the second cathode thereof via the n- layer 107, and propagated to the drain of one of the FETs 33. If an overvoltage is applied to the transmission line 12, the diode 112 breaks down. A surge current therefore flows into a ground via one of the diodes 113. Even in such a case, since the first anode of the diode 112 and the second anode thereof are connected to one another via the low-density n- layer 107, the resistance between the first anode and second anode of the diode is relatively high. The surge current will not therefore flow into the FET 33.

As mentioned above, according to an eighteenth embodiment, the anti-overvoltage protection elements are each realized with the pair of the diode 112 and diode 113 having the anodes thereof connected in common with each other. If an overvoltage is applied to the transmission line 12, the diode 112 breaks down. A surge current is therefore routed to the ground. The FETs 33 and receiving circuit 16 can be protected from the overvoltage.

It should be noted that the present invention is not limited solely to the above embodiments, for example, as shown in the drawings and described herein. Modifications, variations and extensions as further described herein below can also be achieved.

For example, the ON resistance of an FET may be used as an impedance.

In accordance with various alternatives, a fifth to thirteenth embodiment as described herein, may be applied to a single-ended transmission line having one of the signal lines thereof replaced with a grounding conductor and permitting transmission over one signal line.

The step-up means is not limited to the one described in connection with a seventh embodiment but can be any type of step-up means.

The FETs may be p-channel MOSFETs.

The amplification circuit is not limited to the one described in connection with a tenth embodiment.

In a seventeenth embodiment, the gates of each pair of FETs 102 and FETs 103 may be connected to the sources thereof or may be connected to the sources thereof via a resistive element.

In a seventeenth and eighteenth embodiments, the silicon-on-insulator (SOI) and trench-separated structure may be adopted if needed.

A seventeenth and eighteenth embodiments may be applied to a sixth to sixteenth embodiments.

The overcurrent bypass terminal may not be connected to the ground but may be connected to a low-impedance line such as a power supply line.

The anti-overvoltage protection element is not limited to a pair of laterally diffused MOSFETs but may be including double-diffused MOSFETs.

Still further various exemplary and alternative exemplary embodiments are not limited to use in connection with an onboard LAN, but may be applied to any network over which communications are carried out using a wired transmission line.

What is claimed is:

1. A receiving device comprising:
   a receiving circuit configured to receive a signal sent over a transmission line the receiving signal having an energy level; and
   an impedance control means coupled to the receiving circuit and including a sensing unit sensing one or more of a voltage, a current, and a power associated with the energy level of the received signal, the impedance control means for varying an input impedance according to a change in the energy level associated with one or more of the sensed one or more of the voltage, the current, and the power of the received signal so as to reflect an amount of the energy level the received signal that exceeds a predetermined threshold, wherein
   the impedance control means includes a constant current circuit that limits a current associated with the received signal flowing over the transmission line, to a value equal to or smaller than a threshold.

2. The receiving device according to claim 1, wherein the constant current circuit includes constant current diodes.

3. The receiving device according to claim 2, wherein the transmission line is configured as a pair of signal lines and the received signal includes a differential signal transmitted on each line of the pair of signal lines, and wherein a pair of constant current diodes that are connected to each other and oriented in mutually opposite directions is coupled in each line of the pair of signal lines.

4. A receiving device comprising:
   a receiving circuit configured to receive a signal sent over a transmission line the receiving signal having an energy level; and
   an impedance control means coupled to the receiving circuit and including a sensing unit sensing one or more of a voltage, a current, and a power associated with the energy level of the received signal, the impedance control means for varying an input impedance according to a change in the energy level associated with one or more of the sensed one or more of the voltage, the current, and the power of the received signal so as to reflect an amount of the energy level the received signal that exceeds a predetermined threshold, wherein:
   the impedance control means includes field effect transistors inserted to the respective ones of the pair of signal lines constituting the transmission line;
   when the voltage of a received signal sensed by one of the sensing units sensing unit is equal to or smaller than a threshold, a corresponding one of the FETs is turned ON; and
   when the voltage of the received signal exceeds the threshold, the corresponding one of the FETs is turned OFF.

5. The receiving device according to claim 4, wherein:
   when the FETs include depletion type FETs, the sources of the FETs are connected to the receiving circuit sides of the respective ones of the pair of signal lines; and
   the gates of the FETs are connected to one of: the receiving circuit sides of opposite ones of the respective ones of the pair of signal lines different from the respective ones of the pair of signal lines; and a ground.

6. The receiving device according to claim 4, wherein:
   when the FETs include enhancement type FETs, the sources of the FETs are connected to the receiving circuit sides of the respective ones of the pair of signal lines; and
   the gates of the FETs are connected to one of: the receiving circuit sides of opposite ones of the respective ones of the pair of signal lines different from the respective ones of the pair of signal lines, via respective diodes; and a ground, and are also connected to the drains thereof via respective resistive elements.

7. The receiving device according to claim 4, further comprising a step-up means having portions that step up voltages generated on the transmission line and apply the voltages to the gates of the FETs, wherein:
   when the FETs include enhancement type FETs, the sources of the FETs are connected to the receiving circuit sides of the respective ones of the pair of signal lines; and
   the gates of the FETs are connected to one of: the receiving circuit sides of opposite ones of the respective ones of the pair of signal lines different from the respective ones of the pair of signal lines, via respective diodes; and a ground.

8. The receiving device according to claim 7, wherein the step-up means includes a series circuit including a diode and a capacitor connected between the signal lines constituting the transmission line, and a diode connected between the common junction point in the series circuit and the gate of one of the FETs.

9. The receiving device according to claim 4, wherein:
   the sensing unit includes: a reference voltage production means that produces a reference voltage; and portions of a comparison means each of which compares the potential difference between the respective ones of the pair of signal lines with the reference voltage; and the result of the comparison performed by the comparison means is outputted to the gate of one of the FETs.

10. The receiving device according to claim 4, wherein:
the sensing unit includes: a reference voltage production means that produces a reference voltage; a voltage conversion means that converts a current flowing over the transmission line, to a voltage; and comparison circuits each of which compares a voltage produced by the voltage conversion means with the reference voltage; and
the output signal of one of the comparison circuits is applied to the gate of one of the FETs.

11. The receiving device according to claim 10, wherein the voltage conversion means is formed with a voltage division resistive circuit that is included in the receiving circuit and connected between the respective ones of the pair of signal lines constituting the transmission line or between the respective ones of the pair of signal lines constituting the transmission line and the ground.

12. The receiving device according to claim 10, wherein the voltage conversion means includes a voltage conversion element that converts a current flowing over the transmission line, into a voltage, and an amplification circuit that amplifies and outputs the voltage produced by the voltage conversion element.

13. The receiving device according to claim 12, wherein the voltage conversion element includes each of the FETs.

14. The receiving device according to claim 12, wherein the voltage conversion element includes a resistive element connected in series with each of the FETs.

15. The receiving device according to claim 12, wherein:
the amplification circuit includes: an operational amplifier having an inverting input terminal connected to a low-potential terminal of the voltage conversion element and has a non-inverting input terminal thereof connected to a high-potential terminal via a first resistive element; and a transistor having a base and a collector connected to the output terminal and non-inverting input terminal of the operational amplifier and has an emitter thereof connected to the ground via a second resistive element; and
the terminal voltage of the second resistive element is provided as an amplified output.

16. The receiving device according to claim 15, wherein when the voltage conversion element includes each of the FETs, the first resistive element of the amplification circuit is replaced with an FET having a drain and a gate thereof connected in common with a drain and a gate of each of the FETs and has a source thereof connected to the non-inverting input terminal of the operational amplifier.

17. The receiving device according to claim 10, wherein the sensing unit includes a voltage comparison block that compares a potential on one of the signal lines constituting the transmission line with a reference voltage and that outputs the result of the comparison, and outputs an AND conditional signal of the result of the comparison based on a current flowing over the transmission line and the result of the comparison performed by the voltage comparison block, to the gate of each of the FETs.

18. The receiving device according to claim 17, wherein the voltage comparison block compares the potential on one of the signal lines constituting the transmission line with the reference voltage by adopting, as the reference voltage, the sum of one of: the potential on an other of the signal lines; and the ground potential, and a predetermined offset voltage.

19. The receiving device according to claim 4, further comprising:
anti-overvoltage protection elements each disposed between one of the signal lines constituting the transmission line and a FET inserted into the respective signal line, each FET having a signal transmission terminal through which a normal signal sent over the respective signal line is transmitted to the FET, and each having an overcurrent bypass terminal thereof connected to a power supply or a ground, and, when an overvoltage is applied to the one of the signal lines, acts to cause the one of the signal lines and overcurrent bypass terminal to conduct.

20. The receiving device according to claim 19, wherein the anti-overvoltage protection element is formed with one of a double-diffused metal oxide semiconductor field effect transistors, a laterally-diffused MOSFET, and a diode.

21. The receiving device according to claim 19, wherein:
the anti-overvoltage protection elements include first and second FETs connected in series with each other;
the first FET has first and second drains connected to each other via a substrate layer serving as a formation region for the FET;
the sources of the first and second FETs are connected in common with each other, the first drain of the first FET is connected to the one of the pair of signal lines, and the drain of the second FET serves as the overcurrent bypass terminal; and
the second drain of the first FET serves as the signal transmission terminal.

22. The receiving device according to claim 21, wherein the gates of the first and second FETs are left open.

23. The receiving device according to claim 19, wherein:
the anti-overvoltage protection elements includes first and second diodes whose anodes are connected in common with each other;
the first diode has first and second cathodes connected to each other via a substrate layer serving as a formation region of the diode; and
the first cathode of the first diode is connected onto the one of the pair of signal lines, the second cathode of the first diode serves as the signal transmission terminal, and the cathode of the second diode serves as the overcurrent bypass terminal.

24. The receiving device according to claim 19, wherein the FETs included in the impedance control means and the anti-overvoltage protection elements are formed in regions isolated from one another by an insulating material.

25. The receiving device according to claim 19, wherein the FETs included in the impedance control means and the anti-overvoltage protection elements are formed in regions isolated from one another by an insulating material filled in a trench.

* * * * *